US010885560B1

(12) United States Patent
Ramachandran et al.

(10) Patent No.: US 10,885,560 B1
(45) Date of Patent: Jan. 5, 2021

(54) SYSTEMS AND METHODS FOR ANNOTATING ONLINE CONTENT WITH OFFLINE INTERACTION DATA

(71) Applicant: Google LLC, Mountain View, CA (US)

(72) Inventors: Vinod Kumar Ramachandran, Mountain View, CA (US); Surojit Chatterjee, Los Altos, CA (US); Philip McDonnell, Belmont, CA (US)

(73) Assignee: Google LLC, Mountain View, CA (US)

( * ) Notice: Subject to any disclaimer, the term of this patent is extended or adjusted under 35 U.S.C. 154(b) by 268 days.

(21) Appl. No.: 15/833,902

(22) Filed: Dec. 6, 2017

Related U.S. Application Data

(63) Continuation of application No. 14/505,612, filed on Oct. 3, 2014, now abandoned.

(51) Int. Cl.
*G06Q 30/02* (2012.01)
*G06Q 50/00* (2012.01)

(52) U.S. Cl.
CPC ..... *G06Q 30/0277* (2013.01); *G06Q 30/0242* (2013.01); *G06Q 50/01* (2013.01)

(58) Field of Classification Search
CPC .................................................. G06Q 30/0277
USPC ....................................................... 705/14.41
See application file for complete search history.

(56) References Cited

U.S. PATENT DOCUMENTS

| 9,313,359 | B1 * | 4/2016 | Stojancic | H04N 1/32 |
| 2007/0208766 | A1 * | 9/2007 | Malik | G11B 27/034 |
| 2011/0119132 | A1 * | 5/2011 | Morton | G06Q 30/0261 |
| | | | | 705/14.53 |
| 2012/0130796 | A1 * | 5/2012 | Busch | G06Q 30/02 |
| | | | | 705/14.36 |
| 2012/0203572 | A1 * | 8/2012 | Christensen | G06Q 30/02 |
| | | | | 705/3 |
| 2014/0156387 | A1 | 6/2014 | Bruich et al. | |
| 2015/0262221 | A1 * | 9/2015 | Nakano | G06Q 30/0275 |
| | | | | 705/14.45 |
| 2017/0092278 | A1 | 3/2017 | Evermann et al. | |
| 2017/0110130 | A1 | 4/2017 | Sharifi et al. | |
| 2017/0110144 | A1 | 4/2017 | Sharifi et al. | |

(Continued)

OTHER PUBLICATIONS

"Walmart and Google to offer voice-enabled shopping", BBC News, Aug. 23, 2017 (10 pages).

(Continued)

*Primary Examiner* — Azam A Ansari
(74) *Attorney, Agent, or Firm* — Foley & Lardner LLP; James De Vellis

(57) ABSTRACT

A computer-implemented method for annotating online content with offline interaction data and offline interaction conversion data is implemented by a content annotating computing device in communication with a memory. The method includes receiving a set of content interaction data based on an online interaction between an online user and a first online content item, identifying at least one physical location associated with the online content provider, determining a set of offline interaction conversion data based on the set of content interaction data and a set of offline interaction data, receiving a second online content item associated with the online content provider, and annotating the second online content item based at least partially on the set of offline interaction conversion data and the set of offline interaction data.

20 Claims, 9 Drawing Sheets

(56) References Cited

U.S. PATENT DOCUMENTS

2017/0132019 A1 5/2017 Karashchuk et al.
2017/0358301 A1 12/2017 Raitio et al.

OTHER PUBLICATIONS

Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018, 6 pages.
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, Take Two for Samsung's troubled Bixby assistant, BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges at 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017, 8 pages.
U.S. Final Office Action for U.S. Appl. No. 14/505,612 dated Feb. 14, 2018, 25 pages.
U.S. Office Action for U.S. Appl. No. 14/505,612 dated Aug. 10, 2017, 30 pages.
Willens, Max, "For publishers, Amazon Alexa holds promise but not much money (yet)", Digiday, Jul. 6, 2017 (6 pages).

(56) References Cited

OTHER PUBLICATIONS

Final Office Action on U.S. Appl. No. 14/505,612 dated Aug. 20, 2019 (27 pages).

\* cited by examiner

SYSTEMS AND METHODS FOR ANNOTATING ONLINE CONTENT WITH OFFLINE INTERACTION DATA

CROSS REFERENCE TO RELATED APPLICATIONS

This application claims the benefit of priority under 35 U.S.C. § 120 as a continuation of U.S. patent application Ser. No. 14/505,612, filed Oct. 3, 2014, which is hereby incorporated by reference in its entirety.

BACKGROUND

This description relates to online content, and more particularly, to methods and systems for annotating online content with offline interaction data.

At least some online content (i.e., advertising content presented to consumers with online publications or online applications) is associated with an online content provider such as an online advertiser. At least some such online content providers are also associated with a physical location (or locations) such as a physical store. Consumers may also interact with such physical locations in several different ways. Consumers may visit the physical locations to view goods and services (i.e., to browse). Consumers may also visit the physical locations to purchase goods and services (i.e., to buy products). Consumers may also document their experiences with such physical locations by reviewing physical locations. All such interactions may be referred to as "offline store interactions" or "offline interactions."

Online users (including online users that did not make an offline interaction with a physical location of an online content provider) may benefit from offline interaction data and offline interaction conversion data.

BRIEF DESCRIPTION OF THE DISCLOSURE

In one aspect, a computer-implemented method for annotating online content with offline interaction data and offline interaction conversion data is provided. The method is implemented by a content annotating computing device in communication with a memory. The method includes receiving a set of content interaction data based on an online interaction between an online user and a first online content item, identifying at least one physical location associated with the online content provider, determining a set of offline interaction conversion data based on the set of content interaction data and a set of offline interaction data, receiving a second online content item associated with the online content provider, and annotating the second online content item based at least partially on the set of offline interaction conversion data and the set of offline interaction data.

In another aspect, a content annotating computing device for annotating online content with offline interaction data and offline interaction conversion data is provided. Content annotating computing device includes a memory for storing data and a processor in communication with the memory. The processor is configured to receive a set of content interaction data based on an online interaction between an online user and a first online content item, identify at least one physical location associated with the online content provider, determine a set of offline interaction conversion data based on the set of content interaction data and a set of offline interaction data, receive a second online content item associated with the online content provider, and annotate the second online content item based at least partially on the set of offline interaction conversion data and the set of offline interaction data.

In another aspect, a computer-readable storage device having processor-executable instructions embodied thereon, for annotating online content with offline interaction data and offline interaction conversion data is provided. When executed by a computing device, the processor-executable instructions cause the computing device to receive a set of content interaction data based on an online interaction between an online user and a first online content item, identify at least one physical location associated with the online content provider, determine a set of offline interaction conversion data based on the set of content interaction data and a set of offline interaction data, receive a second online content item associated with the online content provider, and annotate the second online content item based at least partially on the set of offline interaction conversion data and the set of offline interaction data.

In another aspect, a system for annotating online content with offline interaction data and offline interaction conversion data is provided. The system includes means for receiving a set of content interaction data based on an online interaction between an online user and a first online content item, means for identifying at least one physical location associated with the online content provider, means for determining a set of offline interaction conversion data based on the set of content interaction data and a set of offline interaction data, means for receiving a second online content item associated with the online content provider, and means for annotating the second online content item based at least partially on the set of offline interaction conversion data and the set of offline interaction data.

In another aspect, the system described above is provided, wherein the system further includes means for receiving the first online content item wherein the first online content item is associated with an online content provider, and wherein the set of content interaction data includes a first identifier identifying the online user, a second identifier identifying the first online content item, and a third identifier associated with the online content provider, and wherein the system also includes means for identifying at least one physical location associated with the online content provider based on the third identifier.

In another aspect, the system described above is provided, wherein the system further includes means for receiving a set of offline interaction data identifying interactions between the online user and the at least one physical location.

In another aspect, the system described above is provided, wherein the system further includes means for receiving a list of physical locations associated with the online content provider, means for storing the list of physical locations in a content provider directory, and means for querying the content provider directory to determine the at least one physical locations.

In another aspect, the system described above is provided, wherein the system further includes means for identifying at least one product identifier associated with the online content item, means for identifying a purchase volume of products associated with the at least one product identifier based on the set of offline interaction data, means for determining a product purchase rate associated with consumer purchases of products with the at least one product identifier based on the set of offline interaction data, and means for annotating the second online content item based on the product purchase rate.

In another aspect, the system described above is provided, wherein the system further includes means for identifying a plurality of demographic characteristics associated with the at least one physical location and means for scaling the offline interaction conversion data based on the plurality of demographic characteristics.

In another aspect, the system described above is provided, wherein the system further includes means for receiving the set of offline interaction data from a user mobile computing device using location services.

In another aspect, the system described above is provided, wherein the system further includes means for receiving the set of offline interaction data from a store computing device interacting with a user mobile computing device.

In another aspect, the system described above is provided, wherein the system further includes means for determining an offline visit rate and an offline purchase rate from the set of offline interaction data, means for determining a visit-purchase rate based on the determined offline visit rate and the offline purchase rate, and means for annotating the second online content item using the visit-purchase rate.

The features, functions, and advantages described herein may be achieved independently in various embodiments of the present disclosure or may be combined in yet other embodiments, further details of which may be seen with reference to the following description and drawings.

Figure 1:
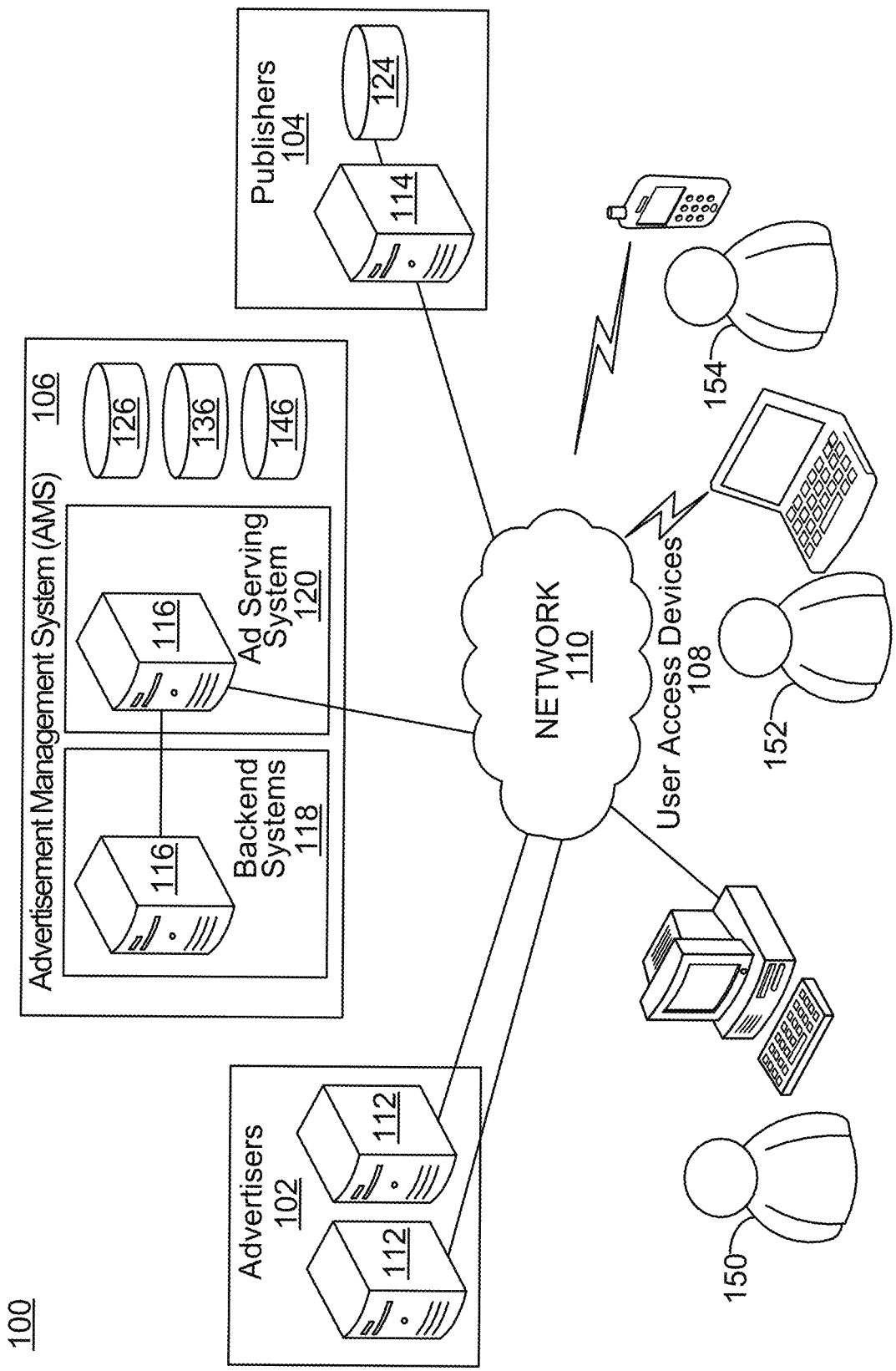
FIG. 1 is a diagram depicting an example online content environment.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of implementations refers to the accompanying drawings. The same reference numbers in different drawings may identify the same or similar elements. Also, the following detailed description does not limit the claims.

The subject matter described herein relates generally to online content, and more particularly, to methods and systems for annotating online content with offline interaction data.

The system described herein is configured to improve online content (e.g., advertisements) provided to online users (e.g., consumers) by annotating the online content to include data related to physical locations (e.g., physical stores) of online content providers such as "offline interaction data" and "offline interaction conversion data", described below.

At least some online content (i.e., advertising content presented to consumers with online publications or online applications) is associated with an online content provider such as an online advertiser. At least some online content may be annotated to include information related to the online content provider including, for example, a user rating of the online content provider, a rating of the popularity of the online content provider on social media, and an expert rating for the online content provider. Online content may be annotated by a number of entities involved in serving and displaying online content. In some examples, annotations may be provided by online content providers, online content networks (e.g., ad networks), or any other suitable service. Such annotations may be used by online content providers to distinguish their content from other online content and attract more online user views, user traffic, and user interaction due to such annotations. Online users may determine whether to interact with or transact at an online content provider's website based on information indicated in such annotations. For example, online users may be more inclined to purchase from an online content provider that has had success in social media as indicated by annotations. Accordingly, annotations may be provided in order to allow online users to distinguish the qualities and characteristics of online content and associated merchants.

At least some such online content providers are also associated with a physical location (or locations) such as a physical store. Consumers may also interact with such physical locations in several different ways. Consumers may visit the physical locations to view goods and services (i.e., to browse). Consumers may also visit the physical locations to purchase goods and services (i.e., to buy products). Consumers may also document their experiences with such physical locations by reviewing physical locations. All such interactions may be referred to as "offline store interactions" or "offline interactions."

In at least some examples, online users may view online content from an online content provider and subsequently engage in offline interactions at a physical location (e.g., a physical store) associated with the same online content provider. Using methods described herein, offline interactions (e.g., visiting, browsing, purchasing) may be associated with the initial viewing of online content. Accordingly, the systems described herein may determine information related to offline interaction ("offline interaction data"). The system may also determine information related to offline interactions made by online users at a physical location of an online content provider after such online users viewed or interacted with online content for the online content provider. Such information may be referred to as "offline interaction conversion data" as it reflects the amount of online users that have a "conversion" activity of an offline interaction. In other words, "offline interaction conversion data" represents "offline interaction data" associated with previous user interaction with online content.

Online users (including online users that did not make an offline interaction with a physical location of an online content provider) may benefit from offline interaction data and offline interaction conversion data. Such data may provide useful indications to online users about the popularity, reliability, quality, and desirability of making offline interactions at physical locations associated with online content providers. Alternately, offline interaction data may also indicate that the online content provider is generally popular, reliable and of high quality and desirability in their online presence (e.g., at an online content provider website or an online content provider application).

The systems and methods described herein provide such information to online users by annotating online content with offline interaction data and offline interaction conversion data. More specifically, in the example embodiment, the systems and methods are implemented by a content annotating computing device configured to: (i) receiving a set of content interaction data based on an online interaction between an online user and a first online content item, (ii) identify at least one physical location associated with the online content provider, (iii) determine a set of offline interaction conversion data based on the set of content interaction data and a set of offline interaction data, (iv) receive a second online content item associated with the online content provider, and (v) annotate the second online content item based at least partially on the set of offline interaction conversion data and the set of offline interaction data.

In the example embodiment, a user (i.e., an online user) navigates to a first online content item (e.g., an advertisement). The first online content item may be displayed, and made visible to the user, on a user computing device (e.g., a mobile telephone computing device) in any suitable online location including, for example, an online publication (e.g., a webpage or an article), an online search tool (e.g., Google™ search) or an online application (e.g., a social game). Alternately phrased, the first online content item is served to a user computing device by an online content provider. The first online content item may include messages describing goods and services offered by the online content provider.

In some examples, the first online content item may include offers related to interactions with physical locations (e.g., physical stores) of the online content provider. For example, the first online content item may include offers such as promotions, discounts, coupons, and rebates that may be available to the online user if the online user visits such a physical location. In other examples, the first online content item may include offers for specific products (i.e., goods or services) that are available for sale. The first online content item may specifically identify a stock keeping unit ("SKU") or a plurality of SKUs associated with such products.

The first online content item may be configured to receive interactions from the online user. Accordingly, the online user may interact with the first online content item in any suitable manner including, for example, viewing the first online content item, and clicking on the first online content item. Such interactions may be referred to as "online interactions." In the example embodiment, the first online content item is further configured to detect, store, and communicate such online interactions. For example, detected online interactions may be stored as "a set of content interaction data", stored, and provided to systems including the content annotating computing device, an online content provider system, and an online content network. Accordingly, in the example embodiment, the content annotating computing device receives a set of content interaction data related to the online interaction. In a first example, the set of content interaction data indicates that online user viewed and clicked on an online advertisement for Merchant A.

In the example embodiment, the set of content interaction data includes a plurality of identifiers that describe content interaction between the online user and the first online content item. The set of content interaction data includes a first identifier identifying the online user. The first identifier may include any suitable form of identification of the online user including, for example, an account number associated with the online user and the online content provider (e.g., "Merchant A" in the first example), an email address, a name, and an alphanumeric string representing the online user. In an example embodiment, the first identifier does not include personally identifiable information.

The set of content interaction data may also include a second identifier identifying the first online content item. The second identifier may identify, for example, the specific first online content item, products associated with the first online content item (e.g., specific SKUs), and the conditions in which it was presented including the date, time, format, and context (i.e., the online publication, online application, search result, or other context) in which the first online content was presented.

The set of content interaction data may also include a third identifier associated with the online content provider. The third identifier therefore would identify "Merchant A" in the first example.

In some examples, the set of content interaction data may also include a fourth identifier that specifies the interaction between the online user and the first online content item. For example, the fourth identifier may specify a type of interaction (e.g., a click, a view, or any other suitable interaction) and parameters of such an interaction (e.g., a duration of viewing or interaction). In additional examples, the set of content interaction data may also include a fifth identifier that identifies a location or geography associated with the online user. As described herein, the fifth identifier may be used to identify a physical location associated with the online content provider and the online user.

In some examples, the first online content item may be associated with a "qualifying action" that defines a minimum set of interactions by the online user. In such examples, the first online content item may be configured to provide the set of content interaction data only when the qualifying action is satisfied (i.e., the minimum set of interactions is received by the online user.) In one example, the qualifying action may be a click of the first online content item and in a second example, the qualifying action may be a minimum viewing duration of the first online content item. Accordingly, in such examples when an online user does not cause a qualifying action with the first online content item, the set of content interaction data may not be received by the content annotating computing device.

Content annotating computing device also identifies at least one physical location associated with the online content provider that provided the first online content item. In one example, the content annotating computing device may identify the at least one physical location using the third identifier (identifying the online content provider) in the set of content interaction data. In the first example, the third identifier identifies "Merchant A" as the online content provider. Accordingly, in that example, the content annotating computing device identifies at least one physical location associated with Merchant A. Content annotating computing device may use a variety of methods to identify at least one physical location associated with the online content provider. In one example, the content annotating computing device receives a list of physical locations associated with each online content provider and stores the list of physical locations (associated with the online content provider) in a content provider directory. Accordingly, in this example, the content annotating computing device may query the content provider directory to determine the at least one physical locations. In a second example, content annotating computing device may use an internet querying service (e.g., a search engine) to identify the at least one physical location associated with the online content provider. The at least one physical location may be identified in any suitable manner including, for example, location name, location street address, and location latitude and longitude. In some examples, the content annotating computing device identifies a "local" physical location that is determined to be local to the online user. For example, the content annotating computing device may use the fifth identifier of the set of content interaction data to identify a location associated with the online user and then find the physical location (or locations) of the online content provider that is most proximate to the online user location.

An illustrative set of content interaction data associated with the interaction of online user ZYX with Merchant A is provided below (Table 1):

TABLE 1

| Online User Identifier | Online Content Item Identifier | Online Content Provider Identifier | User Interaction Identifier | User Location Identifier |
|---|---|---|---|---|
| ZYX123 | Ad B123 for Product 234, Presented Jan. 1, 2015, 8:20 AM, Search Engine A | Merchant A | Click & second viewing | 20 Zip Code 99999 |

As described above and herein, in some embodiments, the content annotating computing device may store user computing device identifiers, user identifiers, geographic identifiers associated with users, and transaction and shopping data associated with users, without including sensitive personal information, also known as personally identifiable information or PII, in order to ensure the privacy of individuals associated with the stored data. Personally identifiable information may include any information capable of identifying an individual. For privacy and security reasons, personally identifiable information may be withheld and only secondary identifiers may be used. For example, data received by the content annotating computing device may identify user "John Smith" as user "ZYX123" without any method of determining the actual name of user "ZYX123". In some examples where privacy and security can otherwise be ensured (e.g., via encryption and storage security), or where individuals consent, personally identifiable information may be received and used by the content annotating computing device. In such examples, personally identifiable information may be needed to reports about groups of online users. In situations in which the systems discussed herein collect personal information about individuals including online users merchants, or may make use of such personal information, the individuals may be provided with an opportunity to control whether such information is collected or to control whether and/or how such information is used. In addition, certain data may be processed in one or more ways before it is stored or used, so that personally identifiable information is removed. For example, an individual's identity may be processed so that no personally identifiable information can be determined for the individual, or an individual's geographic location may be generalized where location data is obtained (such as to a city, ZIP code, or state level), so that a particular location of an individual cannot be determined.

Content annotating computing device receives a set of offline interaction data describing interactions made by users (including the online user) at physical locations of the online content provider. The set of offline interaction data may accordingly be segmented into two categories of data. A first category is data related to interactions between online users and the physical locations of the online content provider. A second category is data related to interactions between "general consumers" (i.e. users not associated with the set of content interaction data) and the physical locations of the online content provider. As described below, each category of data may information useful in annotating online content.

As described above, the first category of the set of offline interaction data represents interactions between online users and the physical locations of the online content provider. This category of the set of offline interaction data therefore corresponds to the first identifier of the set of content interaction data (identifying the online user) and the third identifier of the set of content interaction data (identifying the online content provider).

In either category of the set of offline interaction data, the set of offline interaction data describes offline interaction characteristics including the length of a user visit, the time of a user visit, purchases made by a user, and promotions participated in by the user. In one example, the set of offline interaction data describes the physical location of the offline interaction, the duration of time that the online user was at the physical location, and any transactions made at the physical location. In at least one example, the transaction data (and therefore the set of offline interaction data) may include, for example, product stock keeping units ("SKUs") of products purchased by the online user, product names of products purchased by the online user, product categories of products purchased by the online user, purchase prices of products purchased by the online user, and promotions or incentives associated with the products purchased by the online user.

The set of offline interaction data may be received from any suitable computing device. In one example, the set of offline interaction data may be received from a store computing device (i.e., a computing device at or otherwise associated with a physical location of the online content provider). In such an example, the set of offline interaction data may be received from the store computing device upon interaction with the user computing device. In one example, the store computing device may be in communication with wireless networks or wireless beacons that may detect the presence of a user computing device based on wireless communication. Accordingly, the store computing device may receive information regarding the presence of a user computing device and be capable of transmitting such information to the content annotating computing device. Further, the store computing device may detect the presence of a user or user computing device at a point-of-sale (POS) terminal when a user makes a purchase or other transaction.

Alternately, the set of offline interaction data may be received directly by the user computing device. As described below, in one embodiment the user computing device includes location services which may identify when a user is physically present at the physical location of the online content provider. Accordingly, the user computing device may receive information regarding the user's movement to the physical location of a store, the user's physical presence in the physical location (and the duration of the user's physical presence), and purchases and transactions made by the user. Purchase and transaction information may identify purchases made by the user, returns made by the user, and promotional programs participated in by the user. Depending upon the user computing device's particular settings and attributes, some or all of such information may be detected by user computing device and provided to the content annotating computing device. Content annotating computing device may compare a user identifier associated with the user computing device to the first identifier of the set of content interaction data to determine whether the user computing device is associated with a user that previously interacted with the first online content item. If the user computing device is associated with a user that previously interacted with the first online content item, the received set of offline interaction data may be determined to be in the first category of the set of offline interaction data. Alternately, if the user computing device is not associated with a user that previously interacted with the first online content item, the received set of offline interaction data may be determined to be in the second category of the set of offline interaction data.

Content annotating computing device determines a set of offline interaction conversion data based on the set of content interaction data and the set of offline interaction data. Determining the set of offline interaction conversion data represents determining metrics that may be useful to other online users. In one example, the content annotating computing device determines (based on a plurality of received sets of offline interaction data from the first category of the sets of offline interaction data) a total of actual offline visits and offline purchases made by online users that previously viewed the first online content item. Further, the total of actual offline visits and purchases made by such online users may be further determined for the merchant, generally, or for each physical location of the merchant. Such determined metrics may be referred to as "offline visit rates" and "offline purchase rates". In some examples, the offline purchase rates may be determined as a total of transactions or a total currency value of transactions. In other examples, an average currency value per transaction or an average currency value per visit may be determined. Further, after determining an "offline visit rate" and "offline purchase rates", the content annotating computing system determines a visit-purchase rate based on the determined offline visit rate and the offline purchase rate. In the example embodiment, the "visit-purchase rate" is the "offline purchase rate" divided by the "offline visit rate."

In a second example, the content annotating computing device determines (based on a plurality of received sets of offline interaction data from the first category and second category of the sets of offline interaction data) a total of actual offline visits and offline purchases made by all users, or "aggregate users" (including online users and general consumers). Further, the total of actual offline visits and purchases made by such aggregate users may be further determined for the merchant, generally, or for each physical location of the merchant. Such determined metrics may be referred to as "aggregate user total visits" and "aggregate user total purchases". In some examples, the total of aggregate user offline purchases may be determined as a total of aggregate user transactions or a total currency value of aggregate user transactions. In other examples, an average currency value per aggregate user transaction or an average currency value per aggregate user visit may be determined.

In a third example, the content annotating computing device determines (based on a plurality of received sets of offline interaction data from the first category of the sets of offline interaction data) a total average time of visit by online users that previously viewed the first online content item.

In a fourth example, the content annotating computing device determines (based on a plurality of received sets of offline interaction data from the first category and second category of the sets of offline interaction data) a total average time of visit by aggregate users or only general consumers.

In a fifth example, the content annotating computing device determines (based on a plurality of received sets of offline interaction data from the first category of the sets of offline interaction data) a total percentage of online users that purchased a particular product that was advertised in the first online content item (based on SKU information in the set of offline interaction data and the set of content interaction data) after interacting with the first online content item. Accordingly, such a "product purchase rate" is the percentage of online users that interacted with the first online content item and subsequently purchased an advertised product in the first online content item.

In a sixth example, the content annotating computing device determines (based on a plurality of received sets of offline interaction data from the first category of the sets of offline interaction data) a total percentage of online users that purchased a particular product that was advertised in the first online content item (based on SKU information in the set of offline interaction data and the set of content interaction data) broken down based on the type of interaction that categories of online users had with the first online content item. For example, the content annotating computing device may separately determine a purchase rate for the product for users that clicked on the online content item, users that viewed the online content item, and users that otherwise interacted with the online content item.

In a seventh example, the content annotating computing device determines (based on a plurality of received sets of offline interaction data from the first category of the sets of offline interaction data) a total percentage of online users that visited a physical store broken down based on the type of interaction that categories of online users had with the first online content item. For example, the content annotating computing device may separately determine a visit rate for the product for users that clicked on the online content item, users that viewed the online content item, and users that otherwise interacted with the online content item.

In many examples, such metrics as described in the above examples may be determined in real-time or near real-time manners. Real-time or near real-time metrics, as used in annotations, may substantially help to inform online users of the present popularity of a particular online content provider (or a specific physical location of the online content provider).

In at least some examples, the first category of the set of offline interaction data is filtered based on a conversion window associated with the first online content item. For example, the first online content item may be configured such that events that occur past a particular duration of user interaction will not be considered. In the example embodiment, such a conversion window may be thirty days. In such an example, if the set of offline interaction data reflects offline interactions taking place more than thirty days after the online user interacted with the first online content item, the set of offline interaction data may not be used for analysis and annotation as described herein as part of the first category. However, the information may be regarded as general consumer data and used for those purposes.

In some examples, the content annotating computing device may further determine the popularity of a particular online content provider by comparing the set of offline interaction conversion data for a plurality of online content providers. For example, within a similar category of online content items, it may be possible to rank the set of offline interaction conversion data to determine that a particular online content provider is relatively more popular or successful based on the set of offline interaction conversion data. For example, metrics such as the visit rate, purchase rate, or visit-purchase rates may be used to rank online content providers generally or within particular product categories. Such rankings may be referred to as "merchant indexes", "merchant rankings", "online content provider indexes" or "online content provider rankings". Further, such merchant rankings may be used to identify the highest-ranked (within at least one metric) online content provider.

In other examples, the content annotating computing device may also determine the popularity of online content providers normalized based on the nearby populations (e.g., within a city, state, demographic metropolitan area ("DMA"), or zip code). For example, certain physical locations (stores) associated with online content providers may have a substantially larger or smaller addressable market than others (i.e., because the store is near to or far from a large urban center) and thus raw numbers on the popularity of such a physical location may skew data for that physical location or for the online content provider, generally. Accordingly, in many examples, the content annotating computing device may discount the impact of skewing effects on merchant indexes. In one example, the impact of variant population bases may be discounted by ranking metrics divided by the nearby population (e.g., the population within 10 miles) in order to normalize the distortion caused by population variance. In a second example, the impact of variant numbers of physical locations for each online content provider may be discounted for merchant indexes by ranking metrics divided by the number of physical locations for each online content provider. In a third example, individual physical locations for online content providers may be compared to determine local merchant indexes (i.e., rankings of individual stores of online content providers within a particular area.) Generally, the content annotating computing device may identify demographic characteristics associated with a physical location of an online content provider or the online content provider, generally, and use such demographic characteristics to scale offline interaction conversion data.

Content annotating computing device may also receive information related to online visits and online purchases ("online conversion data") for the online content provider associated with the first online content item. In some examples, as described below, it may be valuable to provide annotations that incorporate both online and offline interaction conversion data. Accordingly, receiving such online conversion data may be useful to provide integrated annotations reflecting online and offline interaction conversion data (the combination of which may be referred to as "integrated conversion data"). Such integrated conversion data may be used for rankings to provide "integrated merchant indexes" reflecting comparisons of various online content providers using online and offline interaction conversion data.

Content annotating computing device also receives a second online content item associated with the online content provider and annotates the second online content item based at least partially on the set of offline interaction conversion data and the set of offline interaction data. More specifically, the content annotating computing device identifies that the second online content item is associated with the same online content provider as the first online content item based on an identifier ("second online content item provider identifier"). Upon such a determination, the content annotating computing device identifies a plurality of offline interaction data, a plurality of online interaction data, a plurality of online interaction conversion data, and a plurality of offline interaction conversion data associated with the identified online content provider. Accordingly, the content annotating computing device substantially identifies or retrieves information determined above including, for example, merchant indexes. Content annotating computing device is further configured to annotate the second online content item with such retrieved information (i.e., the plurality of offline interaction data, the plurality of online interaction data, the plurality of online interaction conversion data, and the plurality of offline interaction conversion data associated with the identified online content provider.) Annotation may include representing any or all of the retrieved information described above within the second online content item, or alternately phrased, editing the second online content item to include some or all of the retrieved information described above. In at least several embodiments, the second online content item is annotated to include the plurality of offline interaction conversion data.

In some examples, the annotations may include annotations based on determined offline visit rates or offline purchase rates, as defined above and determined by the content annotating computing device. For example, the second online content item may be annotated (or edited) to include information for a particular online content provider to state, "80,000 people who viewed this ad visited stores of this merchant yesterday." Alternately, such an annotation may be location-centric and may state, "750 people who viewed this ad visited the store near you in Anytown Mall." Alternately, the annotation may reflect offline purchase rates and state, "40,000 people who viewed this ad made purchases yesterday"

In a second example, the second online content item may be annotated by the content annotating computing device to reflect merchant indexes, as described above and determined by the content annotating computing device. Accordingly, such an annotation may indicate a ranking or index (e.g., between 0-10) to communicate the popularity of a particular store or a particular online content provider.

In a third example, the second online content item may be annotated to reflect integrated conversion data (the combination of online and offline interaction conversion data.) In such cases, the content annotating computing device may include online purchases in creating an annotation such as the merchant index annotation described above.

In a fourth example, the second online content item may be associated with a particular product associated with a particular stock keeping unit ("SKU"). In such examples, the content annotating computing device may annotate the second online content item to reflect the purchase of products indicated in the second online content item. In such scenarios, the second online content item may be annotated to say, for instance "100 people purchased this item yesterday" or "1,000 people purchased items in this category yesterday".

In a fifth example, the second online content item may be annotated by the content annotating computing device with the visit-purchase rate (determined as the "offline purchase rate" divided by the "offline visit rate".)

In other examples, any metric described above may be used to annotate the second online content item. Further, such metrics may be normalized for a particular region or to discount the impact of larger population bases or numbers of stores, as described above.

In some examples, annotations may be described with a standard structure of five components. A first component is an interaction type that distinguishes between visits and purchases. A second component is a value metric (indicating, for example, the number of visits or purchases.) A third component is a category, identifying whether the interaction is associated with a particular product, a category of products, or all products. A fourth component is a geography identifier that identifies the area described by the annotation. For example, the fourth component may identify the annotation as being associated with nationwide offline interactions or regional offline interactions. A fifth component is a time range identifying the time period associated with the offline interactions such as the past day, two days, or week.

Annotation may include representing any or all of the retrieved information described above within the second online content item, or alternately phrased, editing second online content item to include some or all of the retrieved information described above. In at least several embodiments, second online content item is annotated to include offline interaction conversion data.

Accordingly, content annotating computing device annotates second online content item to generate annotated second online content item. Second online content item may be served to user device directly by content annotating computing device or via any suitable intermediary system including data processing systems.

The methods and systems described herein may be implemented using computer programming or engineering techniques including computer software, firmware, hardware or any combination or subset thereof, wherein the technical effects may be achieved by performing one of the following steps: (a) receiving, by the content annotating computing device, a set of content interaction data based on an online interaction between an online user and a first online content item; (b) identifying at least one physical location associated with the online content provider; (c) determining a set of offline interaction conversion data based on the set of content interaction data and a set of offline interaction data; (d) receiving a second online content item associated with the online content provider; (e) annotating the second online content item based at least partially on the set of offline interaction conversion data and the set of offline interaction data; (f) receiving the first online content item wherein the first online content item is associated with an online content provider, and wherein the set of content interaction data includes a first identifier identifying the online user, a second identifier identifying the first online content item, and a third identifier associated with the online content provider and identifying at least one physical location associated with the online content provider based on the third identifier; (g) receiving a set of offline interaction data identifying interactions between the online user and the at least one physical location; (h) receiving a list of physical locations associated with the online content provider, storing the list of physical locations in a content provider directory, and querying the content provider directory to determine the at least one physical locations; (i) identifying at least one product identifier associated with the online content item, identifying a purchase volume of products associated with the at least one product identifier based on the set of offline interaction data, determining a product purchase rate associated with consumer purchases of products with the at least one product identifier based on the set of offline interaction data, and annotating the second online content item based on the product purchase rate; (j) identifying a plurality of demographic characteristics associated with the at least one physical location and scaling the offline interaction conversion data based on the plurality of demographic characteristics; (k) receiving the set of offline interaction data from a user mobile computing device using location services; (l) receiving the set of offline interaction data from a store computing device interacting with a user mobile computing device; and (m) determining an offline visit rate and an offline purchase rate from the set of offline interaction data, determining a visit-purchase rate based on the determined offline visit rate and the offline purchase rate, and annotating the second online content item using the visit-purchase rate.

Technical effects of the methods and systems described herein may include: (a) tracking and providing information related to offline interactions to online users, (b) improved performance of online content provider promotions through near real-time documenting of physical location (store) popularity and the popularity of promotions; and (c) receiving, monitoring, and providing offline interaction data that was not previously available for analysis and provision in conjunction with online content.

Described herein are computer systems such as content annotating computing devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

FIG. 1 is a diagram depicting an example online content environment 100. Online content environment 100 may be used in the context of serving online advertisements to a user, including a user of a mobile computing device, in combination with online publications. With reference to FIG. 1, example environment 100 may include one or more advertisers 102 (i.e., online content providers), one or more publishers 104, an advertisement management system (AMS) 106, and one or more user access devices 108, which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as an advertisement distribution network. While reference is made to distributing advertisements, the environment 100 can be suitable for distributing other forms of content including other forms of sponsored content. AMS 106 may also be referred to as a content management system 106.

The advertisers 102 may include any entities that are associated with advertisements ("ads"). An advertisement or an "ad" refers to any form of communication in which one or more products, services, ideas, messages, people, organizations or other items are identified and promoted (or otherwise communicated). Ads are not limited to commercial promotions or other communications. An ad may be a public service announcement or any other type of notice, such as a public notice published in printed or electronic press or a broadcast. An ad may be referred to as sponsored content.

Ads may be communicated via various mediums and in various forms. In some examples, ads may be communicated through an interactive medium, such as the Internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads could also be communicated through RSS (Really Simple Syndication) feeds, radio channels, television channels, print media, and other media.

The term "ad" can refer to both a single "creative" and an "ad group." A creative refers to any entity that represents one ad impression. An ad impression refers to any form of presentation of an ad such that it is viewable/receivable by a user. In some examples, an ad impression may occur when an ad is displayed on a display device of a user access device. An ad group refers, for example, to an entity that represents a group of creatives that share a common characteristic, such as having the same ad selection and recommendation criteria. Ad groups can be used to create an ad campaign.

The advertisers 102 may provide (or be otherwise associated with) products and/or services related to ads. The advertisers 102 may include or be associated with, for example, retailers, wholesalers, warehouses, manufacturers, distributors, health care providers, educational establishments, financial establishments, technology providers, energy providers, utility providers, or any other product or service providers or distributors.

The advertisers 102 may directly or indirectly generate, and/or maintain ads, which may be related to products or services offered by or otherwise associated with the advertisers. The advertisers 102 may include or maintain one or more data processing systems 112, such as servers or embedded systems, coupled to the network 110. The advertisers 102 may include or maintain one or more processes that run on one or more data processing systems.

The publishers 104 may include any entities that generate, maintain, provide, present and/or otherwise process content in the environment 100. "Publishers," in particular, include authors of content, wherein authors may be individual persons, or, in the case of works made for hire, the proprietor(s) who hired the individual(s) responsible for creating the online content. The term "content" refers to various types of web-based, software application-based and/ or otherwise presented information, including articles, discussion threads, reports, analyses, financial statements, music, video, graphics, search results, web page listings, information feeds (e.g., RSS feeds), television broadcasts, radio broadcasts, printed publications, or any other form of information that may be presented to a user using a computing device such as one of user access devices 108.

In some implementations, the publishers 104 may include content providers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other content providers. One or more of the publishers 104 may represent a content network that is associated with the AMS 106.

The publishers 104 may receive requests from the user access devices 108 (or other elements in the environment 100) and provide or present content to the requesting devices. The publishers may provide or present content via various mediums and in various forms, including web based and non-web based mediums and forms. The publishers 104 may generate and/or maintain such content and/or retrieve the content from other network resources.

In addition to content, the publishers 104 may be configured to integrate or combine retrieved content with additional sets of content, for example ads, that are related or relevant to the retrieved content for display to users 150, 152, and 154. As discussed further below, these relevant ads may be provided from the AMS 106 and may be combined with content for display to users 150, 152, and 154. In some examples, the publishers 104 may retrieve content for display on a particular user access device 108 and then forward the content to the user access device 108 along with code that causes one or more ads from the AMS 106 to be displayed to the user 150, 152, or 154. As used herein, user access devices 108 may also be known as customer computing devices 108. In other examples, the publishers 104 may retrieve content, retrieve one or more relevant ads (e.g., from the AMS 106 or the advertisers 102), and then integrate the ads and the article to form a content page for display to the user 150, 152, or 154.

As noted above, one or more of the publishers 104 may represent a content network. In such an implementation, the advertisers 102 may be able to present ads to users through this content network.

The publishers 104 may include or maintain one or more data processing systems 114, such as servers or embedded systems, coupled to the network 110. They may include or maintain one or more processes that run on data processing systems. In some examples, the publishers 104 may include one or more content repositories 124 for storing content and other information.

The AMS 106 manages ads and provides various services to the advertisers 102, the publishers 104, and the user access devices 108. The AMS 106 may store ads in an ad repository 126 and facilitate the distribution or selective provision and recommendation of ads through the environment 100 to the user access devices 108. In some configurations, the AMS 106 may include or access functionality associated with managing online content and/or online advertisements, particularly functionality associated with serving online content and/or online advertisements to mobile computing devices.

The AMS 106 may include one or more data processing systems 116, such as servers or embedded systems, coupled to the network 110. It can also include one or more processes, such as server processes. In some examples, the AMS 106 may include an ad serving system 120 and one or more backend processing systems 118. As described herein, ad serving system 120 may also function as a content annotating computing device or alternately be in communication with a content annotating computing device (not shown). The ad serving system 120 may include one or more data processing systems 116 and may perform functionality associated with delivering ads to publishers or user access devices 108. The backend processing systems 118 may include one or more data processing systems 116 and may perform functionality associated with identifying relevant ads to deliver, processing various rules, performing filtering processes, generating reports, maintaining accounts and usage information, and other backend system processing. The AMS 106 can use the backend processing systems 118 and the ad serving system 120 to selectively recommend and provide relevant ads from the advertisers 102 through the publishers 104 to the user access devices 108.

The AMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publisher content, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The AMS 106 may include one or more interface or frontend modules for providing the various features to advertisers, publishers, and user access devices. For example, the AMS 106 may provide one or more publisher front-end interfaces (PFEs) for allowing publishers to interact with the AMS 106. The AMS 106 may also provide one or more advertiser front-end interfaces (AFEs) for allowing advertisers to interact with the AMS 106. In some examples, the front-end interfaces may be configured as web applications that provide users with network access to features available in the AMS 106.

The AMS 106 provides various advertising management features to the advertisers 102. The AMS 106 advertising features may allow users to set up user accounts, set account preferences, create ads, select keywords for ads, create campaigns or initiatives for multiple products or businesses, view reports associated with accounts, analyze costs and return on investment, selectively identify customers in different regions, selectively recommend and provide ads to particular publishers, analyze financial information, analyze ad performance, estimate ad traffic, access keyword tools, add graphics and animations to ads, etc.

The AMS 106 may allow the advertisers 102 to create ads and input keywords or other ad placement descriptors for which those ads will appear. In some examples, the AMS 106 may provide ads to user access devices or publishers when keywords associated with those ads are included in a user request or requested content. The AMS 106 may also allow the advertisers 102 to set bids for ads. A bid may represent the maximum amount an advertiser is willing to pay for each ad impression, user click-through of an ad or other interaction with an ad. A click-through can include any action a user takes to select an ad. Other actions include haptic feedback or gyroscopic feedback to generate a click-through. The advertisers 102 may also choose a currency and monthly budget.

The AMS 106 may also allow the advertisers 102 to view information about ad impressions, which may be maintained by the AMS 106. The AMS 106 may be configured to determine and maintain the number of ad impressions relative to a particular website or keyword. The AMS 106 may also determine and maintain the number of click-throughs for an ad as well as the ratio of click-throughs to impressions.

The AMS 106 may also allow the advertisers 102 to select and/or create conversion types for ads. A "conversion" may occur when a user consummates a transaction related to a given ad. A conversion could be defined to occur when a user clicks, directly or implicitly (e.g., through haptic or gyroscopic feedback), on an ad, is referred to the advertiser's web page, and consummates a purchase there before leaving that web page. In another example, a conversion could be defined as the display of an ad to a user and a corresponding purchase on the advertiser's web page within a predetermined time (e.g., seven days). The AMS 106 may store conversion data and other information in a conversion data repository 136.

The AMS 106 may allow the advertisers 102 to input description information associated with ads. This information could be used to assist the publishers 104 in determining ads to publish. The advertisers 102 may additionally input a cost/value associated with selected conversion types, such as a five dollar credit to the publishers 104 for each product or service purchased.

The AMS 106 may provide various features to the publishers 104. The AMS 106 may deliver ads (associated with the advertisers 102) to the user access devices 108 when users access content from the publishers 104. The AMS 106 can be configured to deliver ads that are relevant to publisher sites, site content, and publisher audiences.

In some examples, the AMS 106 may crawl content provided by the publishers 104 and deliver ads that are relevant to publisher sites, site content and publisher audiences based on the crawled content. The AMS 106 may also selectively recommend and/or provide ads based on user information and behavior, such as particular search queries performed on a search engine website, or a designation of an ad for subsequent review, as described herein, etc. The AMS 106 may store user-related information in a general database 146. In some examples, the AMS 106 can add search services to a publisher site and deliver ads configured to provide appropriate and relevant content relative to search results generated by requests from visitors of the publisher site. A combination of these and other approaches can be used to deliver relevant ads.

The AMS 106 may allow the publishers 104 to search and select specific products and services as well as associated ads to be displayed with content provided by the publishers 104. For example, the publishers 104 may search through ads in the ad repository 126 and select certain ads for display with their content.

The AMS 106 may be configured to selectively recommend and provide ads created by the advertisers 102 to the user access devices 108 directly or through the publishers 104. The AMS 106 may selectively recommend and provide ads to a particular publisher 104 (as described in further detail herein) or a requesting user access device 108 when a user requests search results or loads content from the publisher 104.

In some implementations, the AMS 106 may manage and process financial transactions among and between elements in the environment 100. For example, the AMS 106 may credit accounts associated with the publishers 104 and debit accounts of the advertisers 102. These and other transactions may be based on conversion data, impressions information and/or click-through rates received and maintained by the AMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed advertisers 102, publishers 104 and/or user access devices 108, which may be discrete, integrated modules or distributed systems. Similarly, the environment 100 is not limited to a single AMS 106 and may include any number of integrated or distributed AMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 2:
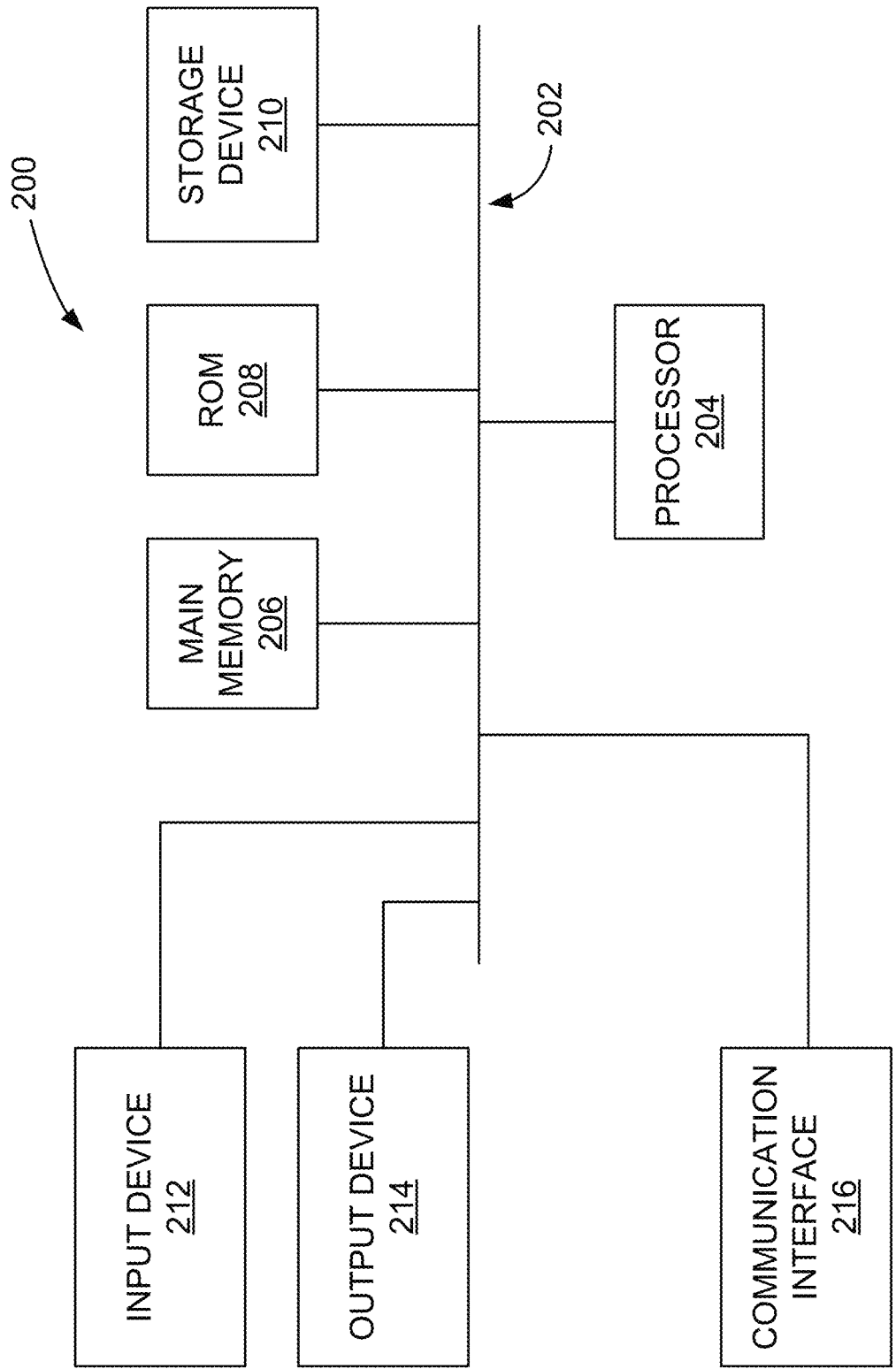
FIG. 2 is a block diagram of a computing device, used for annotating online content with offline interaction data and offline interaction conversion data, as shown in the online content environment of FIG. 1.

FIG. 2 is a block diagram of a computing device 200 used for automatically delivering dynamic online content to a mobile computing device, as shown in advertising environment 100 (shown in FIG. 1).

FIG. 2 shows an example of a generic computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

In the example embodiment, computing device 200 could be user access device 108 or any of data processing devices 112, 114, or 116 (shown in FIG. 1). Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 facilitates the presentation of content from one or more publishers, along with one or more sets of sponsored content, for example ads, to a user. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, WiFi, or other such transceiver (not shown). In addition, a GPS (Global Positioning system) receiver module may provide additional navigation- and location-related wireless data to device 200, which may be used as appropriate by applications running on device 200.

Figure 3:
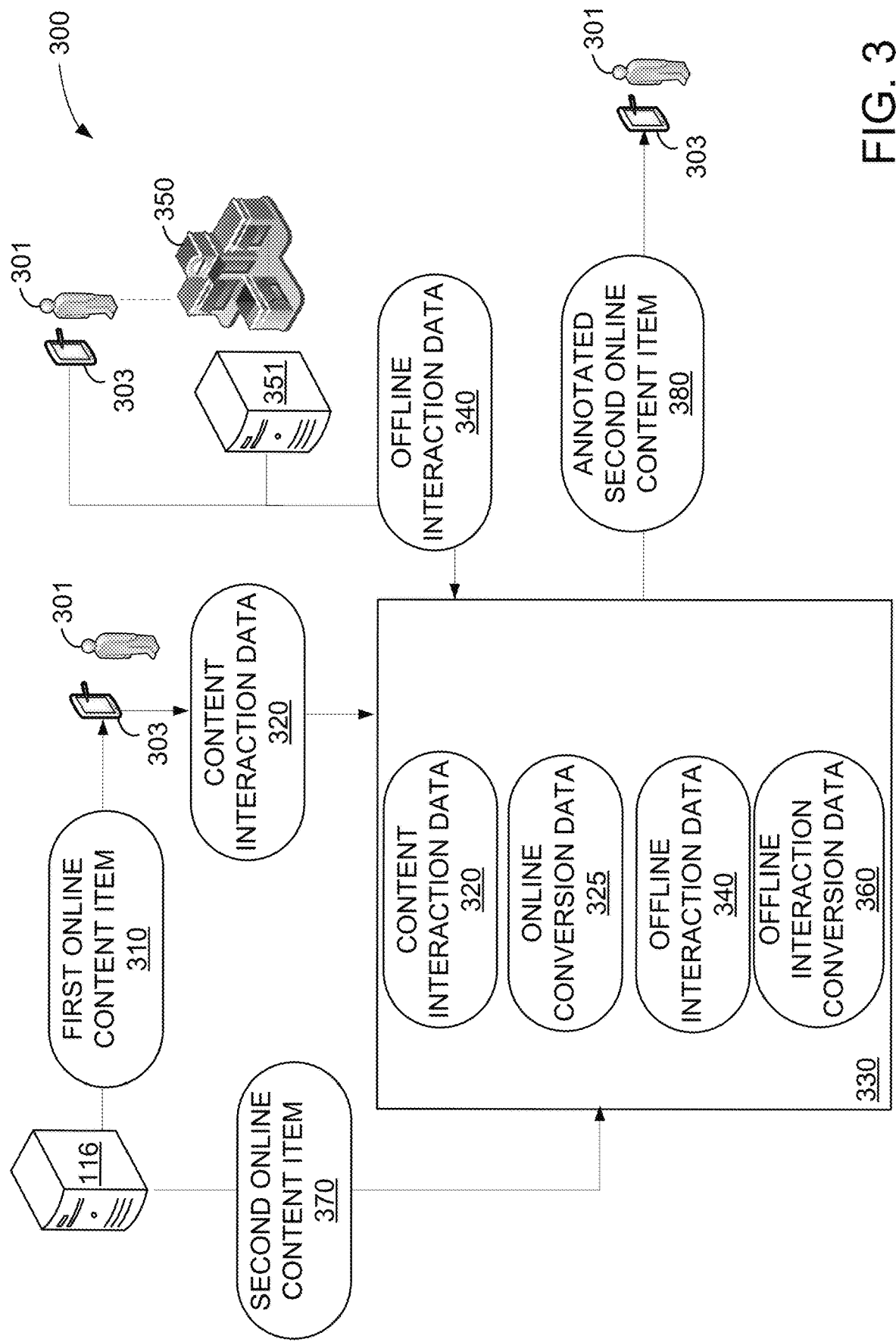
FIG. 3 is an example data flowchart of annotating online content with offline interaction data and offline interaction conversion data using the computing device of FIG. 2 in the online content environment shown in FIG. 1.

FIG. 3 is an example data flowchart of annotating online content with offline interaction data and offline interaction conversion data using the computing device of FIG. 2 in the online content environment shown in FIG. 1.

In the example embodiment, a user 301 (i.e., an online user) uses a user computing device 303 to navigate to a first online content item 310 (e.g., an advertisement). First online content item 310 may be displayed, and made visible to user 301, on user computing device 303 (e.g., a mobile telephone computing device) in any suitable online location including, for example, an online publication (e.g., a webpage or an article), an online search tool (e.g., Google™ search) or an online application (e.g., a social game). Alternately phrased, first online content item 310 is served to a user computing device 303 by an AMS 106 (shown in FIG. 1), and, more specifically, data processing system 116. As described in FIG. 1, although data processing system 112 (shown in FIG. 1) may directly or indirectly generate, and/or maintain online content (such as first online content item 310), data processing systems 116 typically serve such online content to user computing devices 303. First online content item 310 may include messages describing goods and services offered by online content provider 102 (shown in FIG. 1).

In some examples, first online content item 310 may include offers related to interactions with physical locations 350 (e.g., physical stores) of online content provider 102. For example, first online content item 310 may include offers such as promotions, discounts, coupons, and rebates that may be available to online user 301 if online user 301 visits such a physical location 350. In other examples, first online content item 310 may include offers for specific products (i.e., goods or services) that are available for sale. First online content item 310 may specifically identify a stock keeping unit ("SKU") or a plurality of SKUs associated with such products.

First online content item 310 may be configured to receive interactions from user computing device 303 based on the actions of online user 301. Accordingly, online user 301 may use user computing device 303 to interact with first online content item 310 in any suitable manner including, for example, viewing first online content item 310, and clicking on first online content item 310. Such interactions may be referred to as "online interactions." In the example embodiment, the first online content item 310 is further configured to detect, store, and communicate such online interactions. For example, detected online interactions may be stored as "a set of content interaction data" 320, stored, and provided to systems including a content annotating computing device 330, data processing systems 112, 114, and 116 (shown in FIG. 1). As described herein, content annotating computing device 330 may include characteristics of computing device 200 as described in FIG. 2. Further, content annotating computing device 330 may be included within data processing system 116 or in communication with data processing system 116 and used in the serving of online content such as first online content item 310 and second online content item 370.

Accordingly, in the example embodiment, content annotating computing device 330 receives a set of content interaction data 320 related to the online interaction between user computing device 303 and first online content item 310, based on the actions of user 301 using user computing device 303. In a first example, set of content interaction data 320 indicates that online user 301 viewed and clicked on an online advertisement for Merchant A.

In the example embodiment, set of content interaction data 320 includes a plurality of identifiers that describe content interaction between the online user and the first online content item. Set of content interaction data 320 includes a first identifier identifying online user 301 and/or user computing device 303. The first identifier may include any suitable form of identification of online user 301 and/or user computing device 303 including, for example, an account number associated with online user 301 (and/or user computing device 303) and online content provider 102 (e.g., "Merchant A" in the first example), an email address, a name, and an alphanumeric string representing online user 301 and/or user computing device 303. In an example embodiment, the first identifier does not include personally identifiable information.

Set of content interaction data 320 may also include a second identifier identifying first online content item 310. The second identifier may identify, for example, the specific first online content item 310, products associated with first online content item 310 (e.g., specific SKUs), and the conditions in which it was presented including the date, time, format, and context (i.e., the online publication, online application, search result, or other context) in which first online content item 310 was presented.

Set of content interaction data 320 may also include a third identifier associated with online content provider 102. The third identifier therefore would identify "Merchant A" in the first example.

In some examples, set of content interaction data 320 may also include a fourth identifier that specifies the interaction between online user 301 (received by user computing device 303) and first online content item 310. For example, the fourth identifier may specify a type of interaction (e.g., a click, a view, or any other suitable interaction) and parameters of such an interaction (e.g., a duration of viewing or interaction). In additional examples, set of content interaction data 320 may also include a fifth identifier that identifies a location or geography associated with online user 301 and/or user computing device 303. As described herein, the fifth identifier may be used to identify a physical location 350 associated with both online content provider 102 and online user 301 such as the physical location 350 of online content provider 102 nearest to online user 301.

In some examples, first online content item 310 may be associated with a "qualifying action" that defines a minimum set of interactions by online user 301. In such examples, first online content item 310 may be configured to provide set of content interaction data 320 only when the qualifying action is satisfied (i.e., the minimum set of interactions is received by user computing device 303 based on the actions of online user 301.) In one example, the qualifying action may be a click of first online content item 310 and in a second example, the qualifying action may be a minimum viewing duration of first online content item 310. Accordingly, in such examples when online user 301 does not cause a qualifying action with first online content item 310, set of content interaction data 320 may not be received by content annotating computing device 330.

Content annotating computing device 330 also identifies at least one physical location (such as physical location 350) associated with online content provider 102 that created or provided first online content item 310. In one example, content annotating computing device 330 may identify at least one physical location using the third identifier (identifying online content provider 102) in set of content interaction data 320. In the first example, the third identifier identifies "Merchant A" as online content provider 102. Accordingly, in that example, content annotating computing device 330 identifies at least one physical location 350 associated with Merchant A. Content annotating computing device 330 may use a variety of methods to identify at least one physical location 350 associated with online content provider 102. In one example, content annotating computing device 330 receives a list of physical locations 350 associated with each online content provider 102 and stores the list of physical locations 350 (stored with references to associated online content providers 102) in a content provider directory (not shown). Accordingly, in this example, content annotating computing device 330 may query the content provider directory to determine the at least one physical location 350. In a second example, content annotating computing device 330 may use an internet querying service (e.g., a search engine) to identify the at least one physical location 350 associated with online content provider 102. The at least one physical location 350 may be identified in any suitable manner including, for example, location name, location street address, and location latitude and longitude. In some examples, content annotating computing device 330 identifies a "local" physical location 350 that is determined to be local to online user 301 and/or user computing device 303. For example, content annotating computing device 330 may use the fifth identifier of set of content interaction data 320 to identify a location associated with online user 301 (and/or user computing device 303) and then find the physical location 350 (or locations) of online content provider 102 that is most proximate to the location of online user 301 and/or user computing device 303.

As described above and herein, in some embodiments, content annotating computing device 330 may store user computing device identifiers, user identifiers, geographic identifiers associated with online users 301 and user computing devices 303, and transaction and shopping data associated with users, without including sensitive personal information, also known as personally identifiable information or PII, in order to ensure the privacy of individuals associated with the stored data. Personally identifiable information may include any information capable of identifying an individual. For privacy and security reasons, personally identifiable information may be withheld and only secondary identifiers may be used. For example, data received by content annotating computing device 330 may identify user "John Smith" as user "ZYX123" without any method of determining the actual name of user "ZYX123". In some examples where privacy and security can otherwise be ensured (e.g., via encryption and storage security), or where individuals consent, personally identifiable information may be received and used by content annotating computing device 330. In such examples, personally identifiable information may be needed to reports about groups of online users. In situations in which the systems discussed herein collect personal information about individuals including online users merchants, or may make use of such personal information, the individuals may be provided with an opportunity to control whether such information is collected or to control whether and/or how such information is used. In addition, certain data may be processed in one or more ways before it is stored or used, so that personally identifiable information is removed. For example, an individual's identity may be processed so that no personally identifiable information can be determined for the individual, or an individual's geographic location may be generalized where location data is obtained (such as to a city, ZIP code, or state level), so that a particular location of an individual cannot be determined.

Content annotating computing device 330 receives a set of offline interaction data 340 describing interactions made by users (including online user 301) at physical locations 350 of online content provider 102. Set of offline interaction data 340 may accordingly be segmented into two categories of data. A first category is data related to interactions between online users 301 and physical locations 350 of online content provider 102. A second category is data related to interactions between "general consumers" (i.e. users not associated with the set of content interaction data and not shown) and physical locations 350 of online content provider 102. As described below, each category of data may information useful in annotating online content.

As described above, the first category of set of offline interaction data 340 represents interactions between online users 301 and physical locations 350 of online content provider 102. This category of set of offline interaction data 340 therefore corresponds to the first identifier of the set of content interaction data 320 (identifying online user 301) and the third identifier of set of content interaction data 320 (identifying online content provider 102).

In either category of set of offline interaction data 340, the set of offline interaction data 340 describes offline interaction characteristics including the length of a user visit, the time of a user visit, purchases made by a user, and promotions participated in by the user. In one example, set of offline interaction data 340 describes the physical location 350 of the offline interaction, the duration of time that online user 301 was at physical location 350, and any transactions made at physical location 350. In at least one example, the transaction data (and therefore the set of offline interaction data) may include, for example, product stock keeping units ("SKUs") of products purchased by online user 301, product names of products purchased by the online user, product categories of products purchased by the online user, purchase prices of products purchased by the online user, and promotions or incentives associated with the products purchased by online user 301.

The set of offline interaction data may be received from any suitable computing device. In one example, set of offline interaction data 340 may be received from a store computing device 351 (i.e., a computing device at or otherwise associated with a physical location of the online content provider). In such an example, set of offline interaction data 340 may be received from store computing device 351 upon interaction with user computing device 303. In one example, store computing device 351 may be in communication with wireless networks or wireless beacons that may detect the presence of user computing device 303 based on wireless communication. Accordingly, store computing device 351 may receive information regarding the presence of a user computing device 303 and be capable of transmitting such information to content annotating computing device 330. Further, store computing device 351 may detect the presence of user 301 or user computing device 303 at a point-of-sale (POS) terminal when user 301 makes a purchase or other transaction.

Alternately, set of offline interaction data 340 may be received directly by user computing device 303. As described below, in one embodiment user computing device 303 includes location services which may identify when a user computing device 303 (and therefore user 301) is physically present at physical location 350 of online content provider 102. Accordingly, user computing device 303 may receive information regarding the movement of user computing device 303 to physical location 350 of a store, the presence of user computing device 303 in physical location 350 (and the duration of the physical presence of user computing device 303), and purchases and transactions made by user 301. Purchase and transaction information may identify purchases made by user 301, returns made by user 301, and promotional programs participated in by user 301. Depending upon the particular settings and attributes of user computing device 303, some or all of such information may be detected by user computing device 303 and provided to content annotating computing device 330. Content annotating computing device 330 may compare a user identifier associated with user computing device 303 to the first identifier of the set of content interaction data 320 to determine whether user computing device 303 is associated with a user 301 that previously interacted with first online content item 310. If user computing device 303 is associated with a user 301 that previously interacted with first online content item 310, received set of offline interaction data 340 may be determined to be in the first category of set of offline interaction data 340. Alternately, if user computing device 303 is not associated with a user 301 that previously interacted with first online content item 310, received set of offline interaction data 340 may be determined to be in the second category of set of offline interaction data 340.

Content annotating computing device 330 determines a set of offline interaction conversion data 360 based on set of content interaction data 320 and set of offline interaction data 340. Determining set of offline interaction conversion data 360 represents determining metrics that may be useful to other online users 301 and used to annotate second online content item 370. In one example, content annotating computing device 330 determines (based on a plurality of received sets of offline interaction data 340 from the first category of sets of offline interaction data 340) a total of actual offline visits and offline purchases made by online users 301 that previously viewed first online content item 310. Further, the total of actual offline visits and purchases made by such online users may be further determined for the merchant, generally, or for each physical location of the merchant. Such determined metrics may be referred to as "offline visit rates" and "offline purchase rates". In some examples, the offline purchase rates may be determined as a total of transactions or a total currency value of transactions. In other examples, an average currency value per transaction or an average currency value per visit may be determined. Further, after determining an "offline visit rate" and "offline purchase rates", the content annotating computing system determines a visit-purchase rate based on the determined offline visit rate and the offline purchase rate. In the example embodiment, the "visit-purchase rate" is the "offline purchase rate" divided by the "offline visit rate."

In a second example, content annotating computing device 330 determines (based on a plurality of received sets of offline interaction data from the first category and second category of the sets of offline interaction data) a total of actual offline visits and offline purchases made by all users, or "aggregate users" (including online users and general consumers). Further, the total of actual offline visits and purchases made by such aggregate users may be further determined for the merchant, generally, or for each physical location of the merchant. Such determined metrics may be referred to as "aggregate user total visits" and "aggregate user total purchases". In some examples, the total of aggregate user offline purchases may be determined as a total of aggregate user transactions or a total currency value of aggregate user transactions. In other examples, an average currency value per aggregate user transaction or an average currency value per aggregate user visit may be determined.

In a third example, content annotating computing device 330 determines (based on a plurality of received sets of offline interaction data from the first category of the sets of offline interaction data) a total average time of visit by online users that previously viewed the first online content item.

In a fourth example, content annotating computing device 330 determines (based on a plurality of received sets of offline interaction data from the first category and second category of the sets of offline interaction data) a total average time of visit by aggregate users or only general consumers.

In a fifth example, content annotating computing device 330 determines (based on a plurality of received sets of offline interaction data from the first category of the sets of offline interaction data) a total percentage of online users that purchased a particular product that was advertised in the first online content item (based on SKU information in the set of offline interaction data and the set of content interaction data) after interacting with the first online content item. Accordingly, such a "product purchase rate" is the percentage of online users that interacted with the first online content item and subsequently purchased an advertised product in the first online content item.

In a sixth example, content annotating computing device 330 determines (based on a plurality of received sets of offline interaction data from the first category of the sets of offline interaction data) a total percentage of online users that purchased a particular product that was advertised in the first online content item (based on SKU information in the set of offline interaction data and the set of content interaction data) broken down based on the type of interaction that categories of online users had with the first online content item. For example, content annotating computing device 330 may separately determine a purchase rate for the product for users that clicked on the online content item, users that viewed the online content item, and users that otherwise interacted with the online content item.

In a seventh example, content annotating computing device 330 determines (based on a plurality of received sets of offline interaction data from the first category of the sets of offline interaction data) a total percentage of online users that visited a physical store broken down based on the type of interaction that categories of online users had with the first online content item. For example, content annotating computing device 330 may separately determine a visit rate for the product for users that clicked on the online content item, users that viewed the online content item, and users that otherwise interacted with the online content item.

In many examples, such metrics as described in the above examples may be determined in real-time or near real-time manners. Real-time or near real-time metrics, as used in annotations, may substantially help to inform online users of the present popularity of a particular online content provider (or a specific physical location of the online content provider).

In at least some examples, the first category of the set of offline interaction data is filtered based on a conversion window associated with the first online content item. For example, the first online content item may be configured such that events that occur past a particular duration of user interaction will not be considered. In the example embodiment, such a conversion window may be thirty days. In such an example, if the set of offline interaction data reflects offline interactions taking place more than thirty days after the online user interacted with the first online content item, the set of offline interaction data may not be used for analysis and annotation as described herein as part of the first category. However, the information may be regarded as general consumer data and used for those purposes.

In some examples, content annotating computing device 330 may further determine the popularity of a particular online content provider by comparing the set of offline interaction conversion data for a plurality of online content providers. For example, within a similar category of online content items, it may be possible to rank the set of offline interaction conversion data to determine that a particular online content provider is relatively more popular or successful based on the set of offline interaction conversion data. For example, metrics such as the visit rate, purchase rate, or visit-purchase rates may be used to rank online content providers generally or within particular product categories. Such rankings may be referred to as "merchant indexes", "merchant rankings", "online content provider indexes" or "online content provider rankings". Further, such merchant rankings may be used to identify the highest-ranked (within at least one metric) online content provider.

In other examples, content annotating computing device 330 may also determine the popularity of online content providers normalized based on the nearby populations (e.g., within a city, state, demographic metropolitan area ("DMA"), or zip code). For example, certain physical locations (stores) associated with online content providers may have a substantially larger or smaller addressable market than others (i.e., because the store is near to or far from a large urban center) and thus raw numbers on the popularity of such a physical location may skew data for that physical location or for the online content provider, generally. Accordingly, in many examples, content annotating computing device 330 may discount the impact of skewing effects on merchant indexes. In one example, the impact of variant population bases may be discounted by ranking metrics divided by the nearby population (e.g., the population within 10 miles) in order to normalize the distortion caused by population variance. In a second example, the impact of variant numbers of physical locations for each online content provider may be discounted for merchant indexes by ranking metrics divided by the number of physical locations for each online content provider. In a third example, individual physical locations for online content providers may be compared to determine local merchant indexes (i.e., rankings of individual stores of online content providers within a particular area.) Generally, content annotating computing device 330 may identify demographic characteristics associated with a physical location of an online content provider or the online content provider, generally, and use such demographic characteristics to scale offline interaction conversion data.

Content annotating computing device 330 may also receive information related to online visits and online purchases ("online conversion data") for the online content provider associated with the first online content item. In some examples, as described below, it may be valuable to provide annotations that incorporate both online and offline interaction conversion data. Accordingly, receiving such online conversion data may be useful to provide integrated annotations reflecting online and offline interaction conversion data (the combination of which may be referred to as "integrated conversion data"). Such integrated conversion data may be used for rankings to provide "integrated merchant indexes" reflecting comparisons of various online content providers using online and offline interaction conversion data.

Content annotating computing device 330 also receives a second online content item 370 associated with online content provider 102 and annotates second online content item 370 based at least partially on set of offline interaction conversion data 360 and set of offline interaction data 340. More specifically, content annotating computing device 330 identifies that second online content item 370 is associated with the same online content provider as the first online content item based on an identifier ("second online content item provider identifier"). Upon such a determination, content annotating computing device 330 identifies a plurality of offline interaction data, a plurality of online interaction data, a plurality of online interaction conversion data, and a plurality of offline interaction conversion data associated with the identified online content provider. Accordingly, content annotating computing device 330 substantially identifies or retrieves information determined above including, for example, merchant indexes. Content annotating computing device 330 is further configured to annotate second online content item 370 with such retrieved information (i.e., the plurality of offline interaction data, the plurality of online interaction data, the plurality of online interaction conversion data, and the plurality of offline interaction conversion data associated with the identified online content provider.) Annotation may include representing any or all of the retrieved information described above within the second online content item, or alternately phrased, editing second online content item 370 to include some or all of the retrieved information described above. In at least several embodiments, second online content item 370 is annotated to include offline interaction conversion data 360.

Accordingly, content annotating computing device 330 annotates second online content item 370 to generate annotated second online content item 380. Annotated second online content item 380 may be served to user computing device 303 directly by content annotating computing device 330 or via any suitable intermediary system including data processing systems 112, 114, and 116.

In some examples, the annotations may include annotations based on determined offline visit rates or offline purchase rates, as defined above and determined by the content annotating computing device. For example, the second online content item may be annotated (or edited) to include information for a particular online content provider to state, "80,000 people who viewed this ad visited stores of this merchant yesterday." Alternately, such an annotation may be location-centric and may state, "750 people who viewed this ad visited the store near you in Anytown Mall." Alternately, the annotation may reflect offline purchase rates and state, "40,000 people who viewed this ad made purchases yesterday"

In a second example, the second online content item may be annotated by content annotating computing device 330 to reflect merchant indexes, as described above and determined by content annotating computing device 330. Accordingly, such an annotation may indicate a ranking or index (e.g., between 0-10) to communicate the popularity of a particular store or a particular online content provider.

In a third example, the second online content item may be annotated to reflect integrated conversion data (the combination of online and offline interaction conversion data.) In such cases, content annotating computing device 330 may include online purchases in creating an annotation such as the merchant index annotation described above.

In a fourth example, the second online content item may be associated with a particular product associated with a particular stock keeping unit ("SKU"). In such examples, content annotating computing device 330 may annotate the second online content item to reflect the purchase of products indicated in the second online content item. In such scenarios, the second online content item may be annotated to say, for instance "100 people purchased this item yesterday" or "1,000 people purchased items in this category yesterday".

In a fifth example, the second online content item may be annotated by content annotating computing device 330 with the visit-purchase rate (determined as the "offline purchase rate" divided by the "offline visit rate".)

In other examples, any metric described above may be used to annotate the second online content item. Further, such metrics may be normalized for a particular region or to discount the impact of larger population bases or numbers of stores, as described above.

In some examples, annotations may be described with a standard structure of five components. A first component is an interaction type that distinguishes between visits and purchases. A second component is a value metric (indicating, for example, the number of visits or purchases.) A third component is a category, identifying whether the interaction is associated with a particular product, a category of products, or all products. A fourth component is a geography identifier that identifies the area described by the annotation. For example, the fourth component may identify the annotation as being associated with nationwide offline interactions or regional offline interactions. A fifth component is a time range identifying the time period associated with the offline interactions such as the past day, two days, or week.

Figure 4:
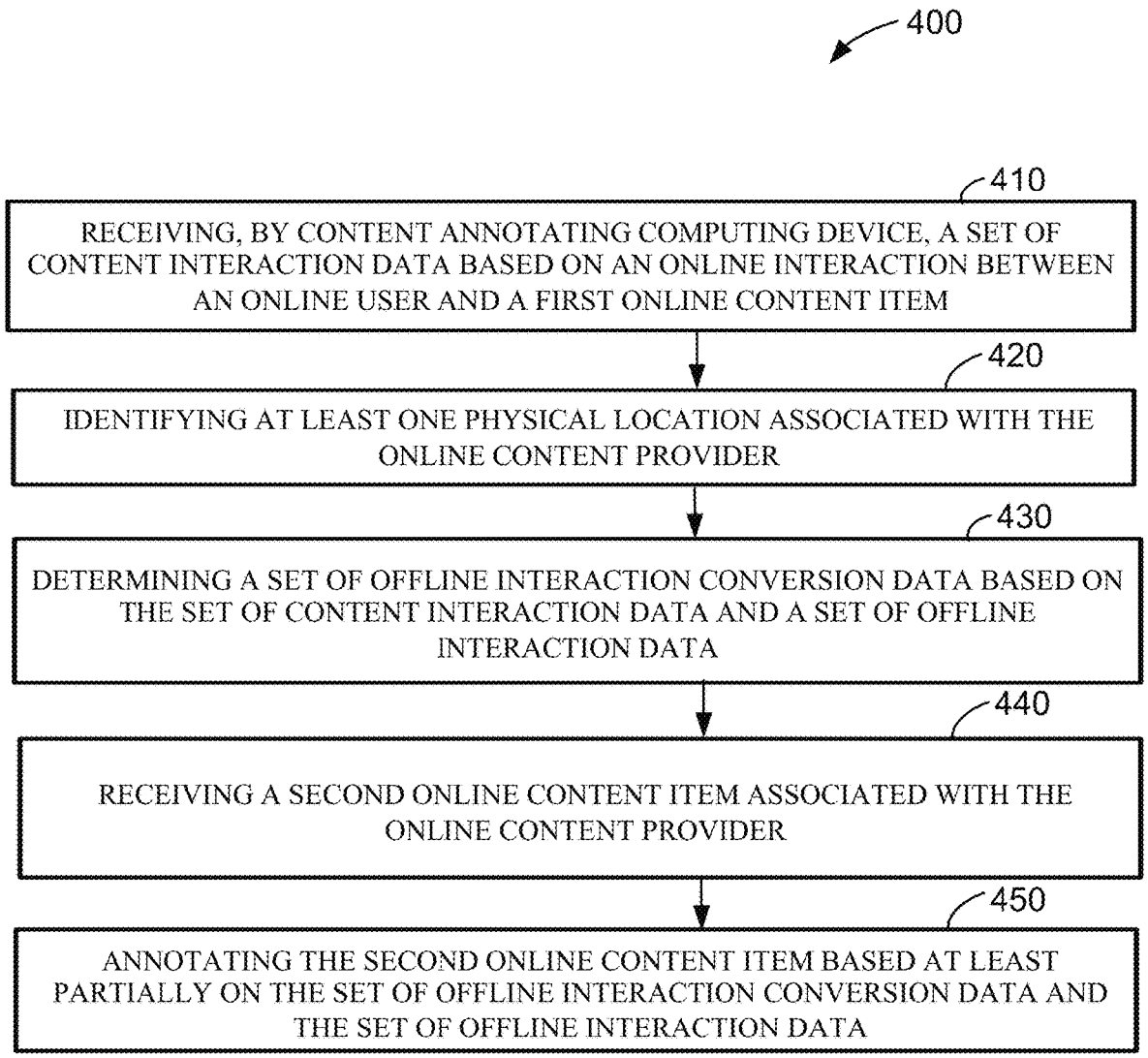
FIG. 4 is an example method of annotating online content with offline interaction data and offline interaction conversion data using the online content environment of FIG. 1.

FIG. 4 is an example method 400 of annotating online content with offline interaction data and offline interaction conversion data using the online content environment of FIG. 1. Method 400 is performed by content annotating computing device 330 (shown in FIG. 3).

Content annotating computing device 330 receives 410 a set of content interaction data based on an online interaction between an online user and a first online content item. Receiving 410 represents content annotating computing device 330 receiving set of content interaction data 320 based on interactions between user computing device 303 (controlled by online user 301) and first online content item 310 (all shown in FIG. 3).

Content annotating computing device 330 also identifies 420 at least one physical location associated with the online content provider. Identifying 420 represents content annotating computing device 330 processing set of content interaction data 320 to identify an online content provider 102 (shown in FIG. 1) associated with first online content item 310 and further processing content interaction data 320 to identify at least one physical location 350 (shown in FIG. 3) associated with first online content item 310 and online content provider 102.

Content annotating computing device 330 also determines 430 a set of offline interaction conversion data based on the set of content interaction data and a set of offline interaction data. Determining 430 represents annotating content annotating computing device 330 processing set of content interaction data 320 and set of offline interaction data 340 to determine set of offline interaction conversion data 360, including metrics related to interactions between online users 301 and physical locations 350.

Content annotating computing device 330 also receives 440 a second online content item associated with the online content provider. Receiving 440 represents content annotating computing device 330 receiving, from online content provider 102 (via any suitable data processing system), second online content item 370.

Content annotating computing device 330 also annotates 450 the second online content item based at least partially on the set of offline interaction conversion data and the set of offline interaction data. Annotating 450 represents content annotating computing device 330 updating, revising, or amending second online content item 370 to include at least some information of offline interaction conversion data 360 and generate annotated second online content item 380. In at least some examples, annotating 450 also includes annotating second online content item 370 with content interaction data 320, online conversion data 325, and offline interaction data 340. In further examples, content annotating computing device 330 also provides annotated second online content item 380 to an online user 301 that may or may not be the same online user 301 that was previously served first online content item 310. In at least several examples, online user 301 that is served first online content item 310 is not the same online user 301 that is served annotated second online content item 380.

Figure 5:
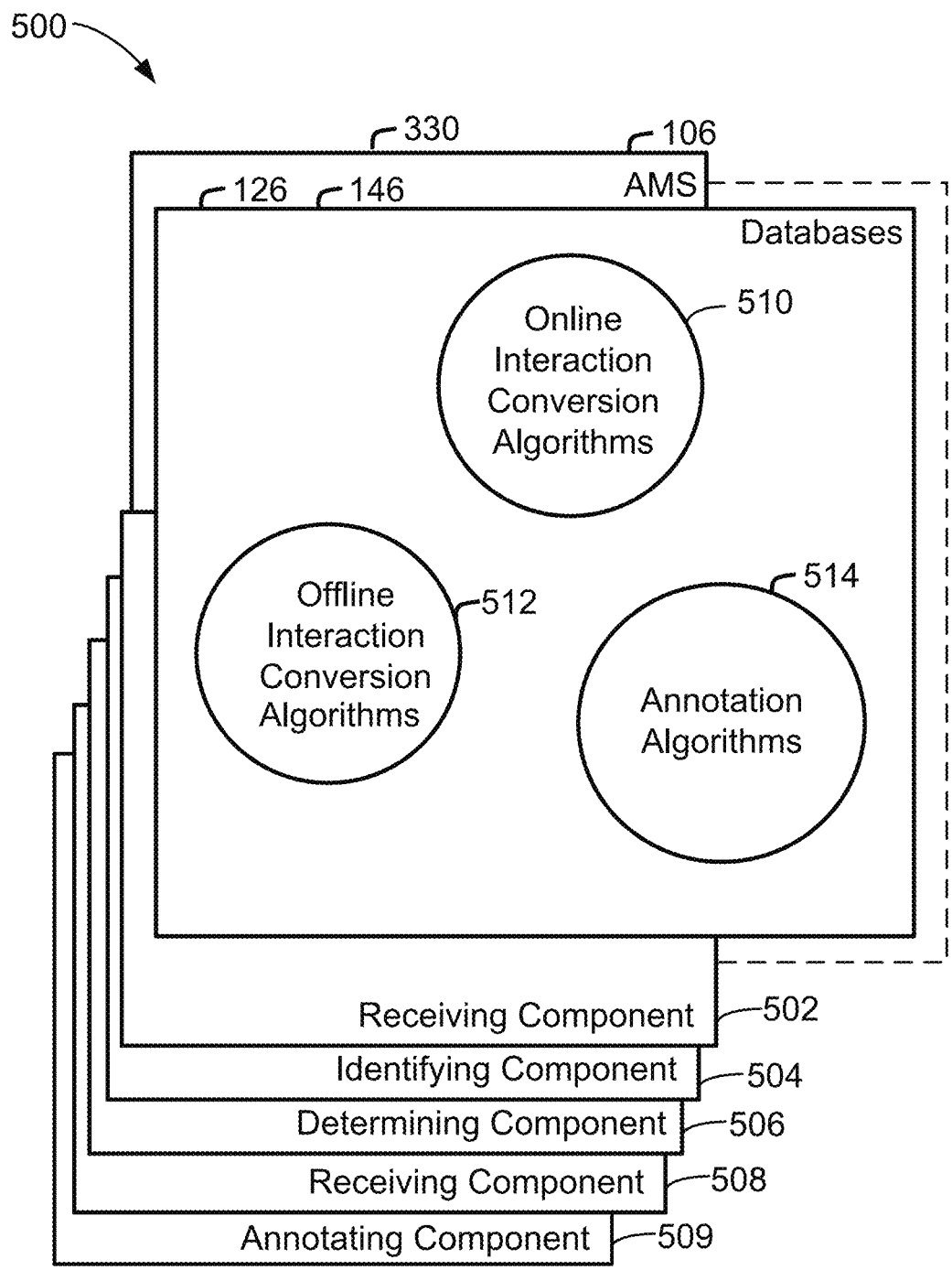
FIG. 5 is a diagram of components of one or more example computing devices, for annotating online content with offline interaction data and offline interaction conversion data using the online content environment that may be used in the environment shown in FIG. 1.

FIG. 5 is a diagram of components of one or more example computing devices, for annotating online content with offline interaction data and offline interaction conversion data using the online content environment that may be used in the environment shown in FIG. 1.

For example, one or more of computing devices 200 may form advertising management system (AMS) 106, customer computing device 108 (both shown in FIG. 1), content annotating computing device 120, and content annotating computing device 330. FIG. 5 further shows a configuration of databases 126 and 146 (shown in FIG. 1). Databases 126 and 146 are coupled to several separate components within content annotating computing device 330, content provider data processing system 112, and customer computing device 108, which perform specific tasks.

Content annotating computing device 330 includes a first receiving component 502 for receiving a set of content interaction data based on an online interaction between an online user and a first online content item. Content annotating computing device 330 additionally includes an identifying component 504 for identifying at least one physical location associated with the online content provider. Content annotating computing device 330 further includes a determining component 506 for determining a set of offline interaction conversion data based on the set of content interaction data and a set of offline interaction data. Content annotating computing device 330 also includes a second receiving component 508 for receiving a second online content item associated with the online content provider.

Content annotating computing device 330 additionally includes an annotating component 509 for annotating.

In an exemplary embodiment, databases 126 and 146 are divided into a plurality of sections, including but not limited to, an online interaction conversion section 510, an offline interaction conversion algorithm section 512, and an annotation algorithm section 514. These sections within database 126 and 146 are interconnected to update and retrieve the information as required.

Figure 6:
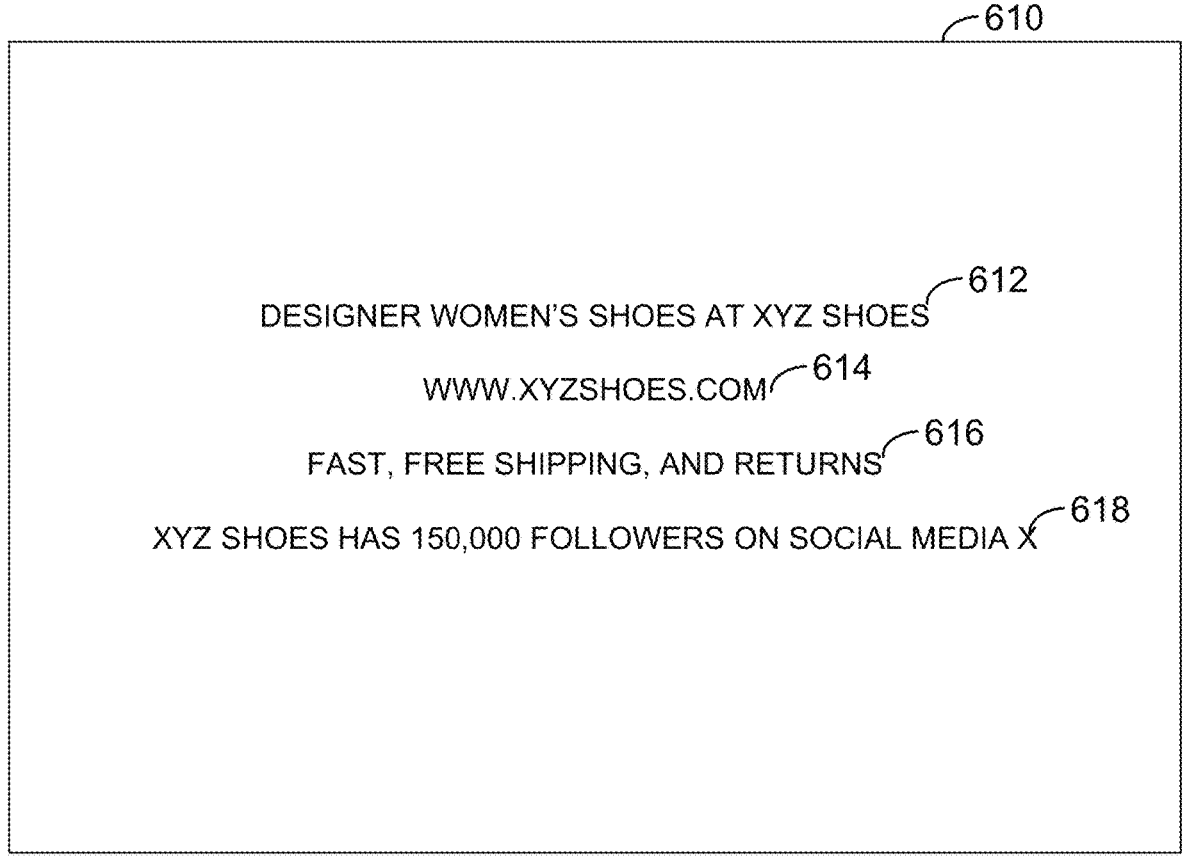
FIG. 6 is a first illustrative example of online content received by the content annotating computing device.

FIG. 6 is a first illustrative example of online content 610 received by content annotating computing device 330 (shown in FIG. 3). Online content 610 may represent any online content that may be annotated by content annotating computing device 330 including, for example, second online content item 370. As described herein, content such as online content 610 may be associated with an online content provider 102 (shown in FIG. 1) and associated with physical locations 350 (shown in FIG. 3) associated with online content provider 102. Online content 610 may include standard components of online content items including, for example, a headline 612, a link 614, a description 616, and online interaction annotation 618. However, online content 610 received by content annotating computing device 330 does not include annotations related to offline interactions.

Online content 610 may be processed using the systems and methods described herein and further associated with offline interaction data 340 (shown in FIG. 3) that may be used to annotate online content 610.

Figure 7:
FIG. 7 is a second illustrative example of annotated online content generated by the content annotating computing device annotating the online content of FIG. 6.

FIG. 7 is a second illustrative example of annotated online content 710 generated by content annotating computing device 330 (shown in FIG. 3) annotating online content 610 (shown in FIG. 6). Accordingly, online content 710 includes annotations 720, 730, 740, 750, 760, and 770. As described herein, annotations 720, 730, 740, 750, 760, and 770 may be generated by content annotating computing device 330 processing offline interaction data 340 to determine offline interaction conversion data 360. Further, annotations 720, 730, 740, 750, 760, and 770 may include content interaction data 320, online conversion data 325, offline interaction data 340, and offline interaction conversion data 360.

Annotations 720, 730, 740, 750, 760, and 770 represent various versions of annotations that may be rendered by content annotating computing device 330. For example, annotations 720 and 730 reflect purchase rates and visit rates for an online content provider 102 (in this case, XYZ Shoes). Further, as described above, many annotations may be described with a standard structure of five components. A first component is an interaction type that distinguishes between visits and purchases. In the case of annotation 720, the interaction type is "purchase" or "transaction" while in annotation 730, the interaction type is "visit". A second component is a value metric (indicating, for example, the number of visits or purchases.) In the case of annotation 720, the value metric is 40,000 while in the case of annotation 730, the value metric is 500,000. A third component is a category, identifying whether the interaction is associated with a particular product, a category of products, or all products. In the cases of annotations 720, the category is "shoes" while in the case of annotation 730, the category is "all" since the visits may related to any category. A fourth component is a geography identifier that identifies the area described by the annotation. For example, the fourth component may identify the annotation as being associated with nationwide offline interactions or regional offline interactions. In the cases of annotations 720, 730, and 760, the geography identifier is "national" while in the cases of annotations 740, 750, and 770, the geography identifier is "Anytown". A fifth component is a time range identifying the time period associated with the offline interactions such as the past day, two days, or week. In the case of annotation 720, the time range is the past day while in the case of annotation 730, the time range is the past week.

Figure 8:
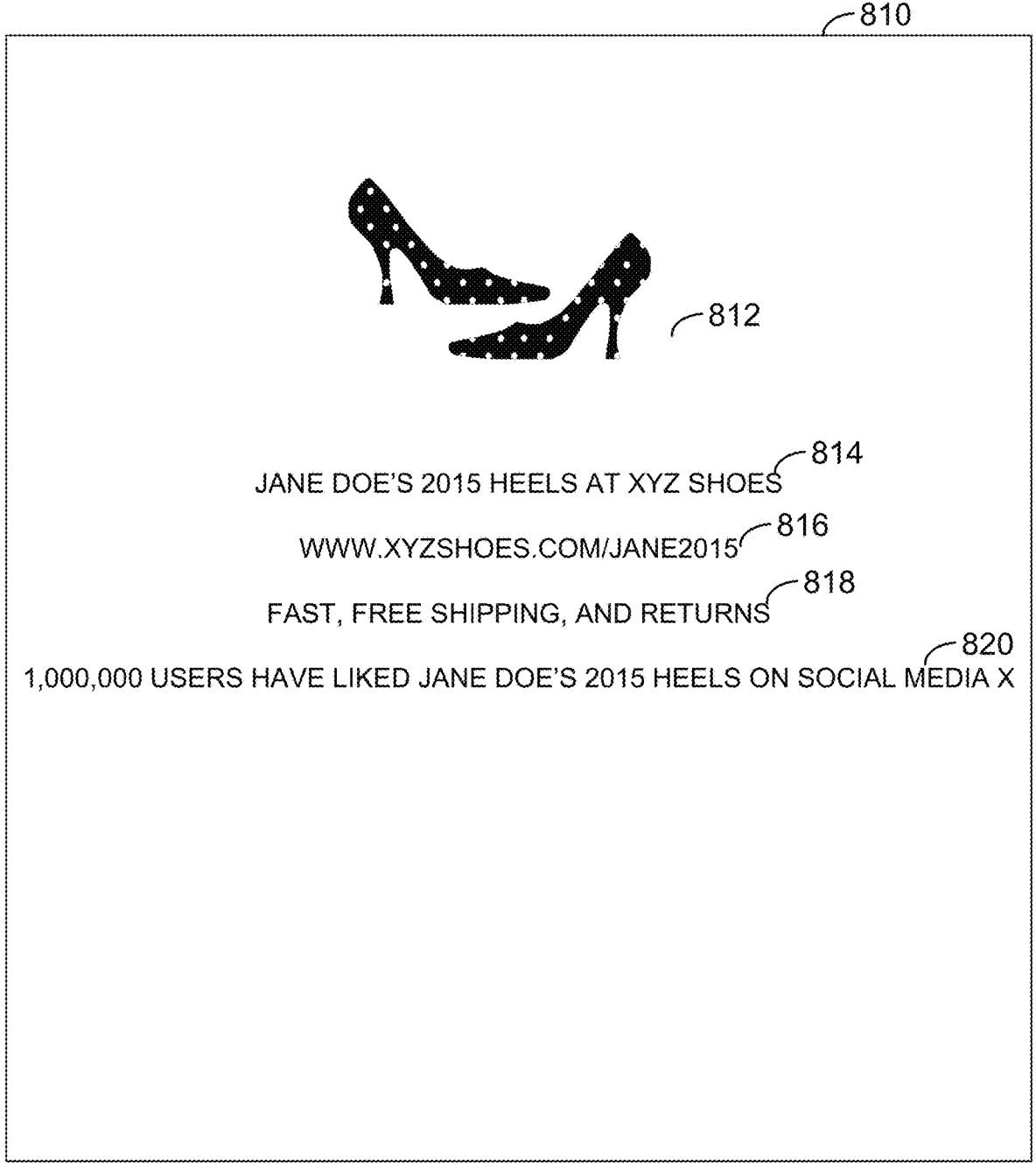
FIG. 8 is a third illustrative example of online content received by the content annotating computing device.

FIG. 8 is a third illustrative example of online content 810 received by content annotating computing device 330 (shown in FIG. 3). Online content 810 may represent any online content that may be annotated by content annotating computing device 330 including, for example, second online content item 370. As described herein, content such as online content 810 may be associated with an online content provider 102 (shown in FIG. 1) and associated with physical locations 350 (shown in FIG. 3) associated with online content provider 102.

Figure 9:
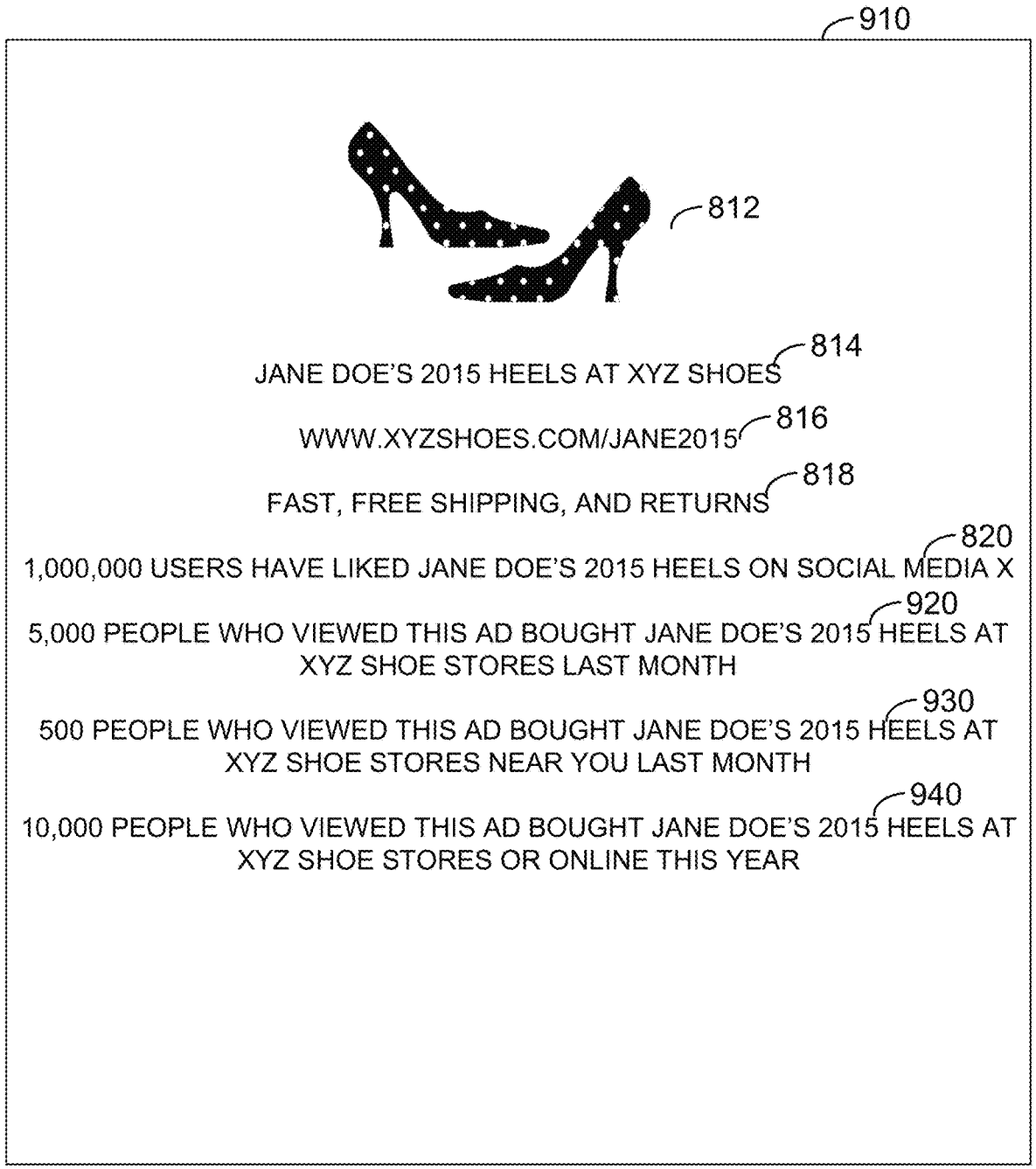
FIG. 9 is a fourth illustrative example of annotated online content generated by the content annotating computing device annotating the online content of FIG. 8.

In contrast to online content 610, online content 810 is product focused and therefore may be annotated with product specific annotations as shown in FIG. 9. Online content 810 may include standard components of online content items including, for example, a product image 812, a headline 814, a link 816, a description 818, and online interaction annotation 820. However, online content 810 received by content annotating computing device 330 does not include annotations related to offline interactions.

Online content 810 may be processed using the systems and methods described herein and further associated with offline interaction data 340 (shown in FIG. 3) that may be used to annotate online content 810.

FIG. 9 is a fourth illustrative example of annotated online content 910 generated by content annotating computing device 330 (shown in FIG. 3) annotating the online content 810 (shown in FIG. 8). Like online content 710, online content 910 includes annotations such as annotations 920, 930, and 940. As is shown, annotations 920, 930, and 940 relate to individual products (i.e., Jane Doe's 2015 heels).

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A system to annotate content items, comprising:
an interface and a content annotation system executed by one or more processors to:
receive offline interaction data comprising a first identifier and an indication of an interaction between a merchant computing device located at a physical location of a merchant and one or more user computing devices associated with an online user;
receive an audio-based input detected by a microphone of the one or more user computing devices associated with the online user and a second identifier corresponding to the online user providing the audio-based input;
identify, responsive to receipt of the audio-based input, a request in the audio-based input;
select a first content item based on the request identified in the audio-based input;
compare the second identifier of the online user that provided the audio-based input with the first identifier corresponding to the interaction with the merchant computing device to determine that the audio-based input and the interaction are associated with a same online user;
generate, responsive to the determination that the audio-based input detected by the one or more user computing devices and the interaction with the merchant computing device are associated with the same online user, an annotation based on the offline interaction data comprising the indication of the interaction between the merchant computing device located at the physical location of the merchant and the one or more user computing devices;
annotate the first content item to include the annotation; and
transmit, responsive to the audio-based input, the first content item with the annotation to the one or more user computing devices.

2. The system of claim 1, comprising:
the interface to transmit, to a second client computing device, a second content item, the second content item corresponding to the physical location of the merchant;
the interface to receive online interaction data indicating an interaction between the second client computing device and the second content item; and
the content annotation system to generate the annotation based on the online interaction data.

3. The system of claim 1, comprising:
the interface to transmit, to a second client computing device, a second content item, the second content item corresponding to the physical location of the merchant;
the interface to receive online interaction data indicating an interaction between the second client computing device and the second content item;
the content annotation system to generate a second annotation based on the online interaction data; and
the content annotation system to include the second annotation in the content item.

4. The system of claim 1, comprising:
the content annotation system to select the first content item based on the physical location of the merchant.

5. The system of claim 1, wherein the interaction between the merchant computing device located at the physical location of the merchant and the one or more user computing devices indicates that the one or more user computing devices was present at the physical location of the merchant.

6. The system of claim 1, wherein the offline interaction data comprises an indication of an interaction between a plurality of computing devices located at a plurality of physical locations and a plurality of client computing devices.

7. The system of claim 6, wherein each of the plurality of physical locations corresponds to the physical location of the merchant.

8. The system of claim 1, comprising:
the content annotation system to identify a plurality of demographic characteristics associated with the physical location of the merchant; and
the content annotation system to scale the offline interaction data based on the plurality of demographic characteristics.

9. The system of claim 1, wherein the annotation comprises a portion of the offline interaction data.

10. The system of claim 1, comprising:
the interface to receive a second audio-based input detected by the microphone of the one or more user computing devices;
the content annotation system to identify a second request in the second audio-based input;
the content annotation system to select a second content item based on the second request identified in the second audio-based input;
the content annotation system to generate a second annotation based on received online interaction data indicating an interaction between a plurality of client computing devices and a plurality of content items;
the content annotation system to annotate the second content item to include the generated second annotation; and
the interface to transmit the second content item comprising the second annotation to the one or more user computing devices.

11. A method to annotate content items, comprising:
receiving, by a content annotating computing device, offline interaction data comprising a first identifier and an indication of an interaction between a merchant computing device located at a physical location of a merchant and one or more user computing devices associated with an online user;
receiving, by the content annotating computing device, an audio-based input detected by a microphone of the one or more user computing devices associated with the online user and a second identifier corresponding to the online user providing the audio-based input;
identifying, by the content annotating computing device responsive to receipt of the audio-based input, a request in the audio-based input;
selecting, by the content annotating computing device, a first content item based on the request identified in the audio-based input;
comparing, by the content annotating computing device, the second identifier of the online user that provided the audio-based input with the first identifier corresponding to the interaction with the merchant computing device to determine that the audio-based input and the interaction are associated with a same online user;
generating, by the content annotating computing device responsive to the determination that the audio-based input detected by the one or more user computing devices and the interaction with the merchant computing device are associated with the same online user, an annotation based on the offline interaction data comprising the indication of the interaction between the merchant computing device located at the physical location of the merchant and the one or more user computing devices;
annotating, by the content annotating computing device and responsive to generating the annotation, the first content item to include the annotation; and
transmitting, by the content annotating computing device, the first content item annotated to include the annotation to the one or more user computing devices responsive to receiving the audio-based input.

12. The method of claim 11, comprising:
transmitting, to a second client computing device, a second content item, the second content item corresponding to the physical location of the merchant;
receiving online interaction data indicating an interaction between the second client computing device and the second content item; and
generating the annotation based on the online interaction data.

13. The method of claim 11, comprising:
transmitting, to a second client computing device, a second content item, the second content item corresponding to the physical location of the merchant;
receiving online interaction data indicating an interaction between the second client computing device and the second content item;
generating a second annotation based on the online interaction data; and
annotating the content item to include the second annotation.

14. The method of claim 11, comprising:
selecting the first content item based on the physical location of the merchant.

15. The method of claim 11, wherein the interaction between the merchant computing device located at the physical location of the merchant and the one or more user computing devices indicates that the one or more user computing devices was present at the physical location of the merchant.

16. The method of claim 11, wherein the offline interaction data comprises an indication of an interaction between a plurality of computing devices located at a plurality of physical locations and a plurality of client computing devices.

17. The method of claim 16, wherein each of the plurality of physical locations corresponds to the physical location.

18. The method of claim 11, comprising:
identifying a plurality of demographic characteristics associated with the physical location of the merchant; and
scaling the offline interaction data based on the plurality of demographic characteristics.

19. The method of claim 11, wherein the annotation comprises a portion of the offline interaction data.

20. The method of claim 11, comprising:
receiving a second audio-based input detected by the microphone of the one or more user computing devices;
identifying a second request in the second audio-based input;
selecting a second content item based on the second request identified in the second audio-based input;
generating a second annotation based on received online interaction data indicating an interaction between a plurality of client computing devices and a plurality of content items;
annotating, responsive to generating the annotation, the second content item to include the generated second annotation; and
transmitting the second content item comprising the second annotation to the one or more user computing devices.

* * * * *